US010045329B2

(12) United States Patent
Jung

(10) Patent No.: US 10,045,329 B2
(45) Date of Patent: Aug. 7, 2018

(54) METHOD AND APPARATUS FOR USING UNLICENSED BAND CHANNEL IN CELLULAR WIRELESS COMMUNICATION SYSTEM

(71) Applicant: Samsung Electronics Co., Ltd., Suwon-si, Gyeonggi-do (KR)

(72) Inventor: Ha-Kyung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 14/683,770

(22) Filed: Apr. 10, 2015

(65) Prior Publication Data

US 2015/0296516 A1 Oct. 15, 2015

(30) Foreign Application Priority Data

Apr. 10, 2014 (KR) .................. 10-2014-0042921

(51) Int. Cl.
  *H04W 72/02* (2009.01)
  *H04W 16/14* (2009.01)
  *H04W 48/14* (2009.01)
  *H04W 48/16* (2009.01)

(52) U.S. Cl.
  CPC .......... *H04W 72/02* (2013.01); *H04W 16/14* (2013.01); *H04W 48/14* (2013.01); *H04W 48/16* (2013.01)

(58) Field of Classification Search
  None
  See application file for complete search history.

(56) References Cited

U.S. PATENT DOCUMENTS

| 8,874,124 B2 | 10/2014 | Clegg | |
|---|---|---|---|
| 2010/0069013 A1* | 3/2010 | Chaudhri | H04W 16/14 455/67.11 |
| 2011/0228666 A1* | 9/2011 | Barbieri | H04W 76/023 370/216 |
| 2011/0287794 A1* | 11/2011 | Koskela | H04W 28/08 455/509 |
| 2012/0300647 A1* | 11/2012 | Nandagopal | H04L 43/0882 370/252 |
| 2013/0003591 A1* | 1/2013 | Novak | H04W 36/06 370/252 |
| 2013/0176934 A1 | 7/2013 | Malladi et al. | |

(Continued)

FOREIGN PATENT DOCUMENTS

| WO | 2012/116489 A1 | 9/2012 |
|---|---|---|
| WO | 2012/162874 A1 | 12/2012 |
| WO | 2013/131250 A1 | 9/2013 |

OTHER PUBLICATIONS

"UE Capability for Dual Connectivity", R1-140377, 3GPP TSG RAN WG1 #76, Feb. 14, 2014.

*Primary Examiner* — James P Duffy
(74) *Attorney, Agent, or Firm* — Jefferson IP Law, LLP

(57) ABSTRACT

A method for using at least one unlicensed band channel by an evolved Node B (eNB) in a cellular wireless communication system is provided. The method includes receiving unlicensed band channel information from at least one unlicensed band-enabled device that uses an unlicensed band channel, selecting the unlicensed band channel to be used for cellular communication based on the received unlicensed band channel information, and activating the selected unlicensed band channel.

48 Claims, 14 Drawing Sheets

(56) References Cited

U.S. PATENT DOCUMENTS

| | | | |
|---|---|---|---|
| 2013/0252654 A1* | 9/2013 | Dimou | H04W 76/023 |
| | | | 455/509 |
| 2013/0336156 A1* | 12/2013 | Wei | H04L 5/001 |
| | | | 370/252 |
| 2013/0337821 A1 | 12/2013 | Clegg | |
| 2014/0031054 A1 | 1/2014 | Zou et al. | |
| 2014/0376483 A1* | 12/2014 | Hong | H04W 72/048 |
| | | | 370/329 |
| 2014/0378157 A1* | 12/2014 | Wei | H04W 16/14 |
| | | | 455/454 |
| 2015/0009869 A1 | 1/2015 | Clegg | |
| 2015/0009962 A1 | 1/2015 | Clegg | |
| 2016/0021581 A1* | 1/2016 | Deenoo | H04W 36/0055 |
| | | | 370/331 |

* cited by examiner

METHOD AND APPARATUS FOR USING UNLICENSED BAND CHANNEL IN CELLULAR WIRELESS COMMUNICATION SYSTEM

CROSS-REFERENCE TO RELATED APPLICATION(S)

This application claims the benefit under 35 U.S.C. § 119(a) of a Korean patent application filed on Apr. 10, 2014 in the Korean Intellectual Property Office and assigned Serial number 10-2014-0042921, the entire disclosure of which is hereby incorporated by reference.

TECHNICAL FIELD

The present disclosure relates to a method and an apparatus for performing cellular communication using an unlicensed band in a cellular wireless communication system.

BACKGROUND

With the advent of smart phones, the amount of mobile traffic has increased explosively, and communication services using the unlicensed band that is not licensed for a particular communication operator, such as Wireless Local Area Network (WLAN) or Bluetooth, have been provided. The WLAN network that can be built at a low cost has attracted attention as a major solution for the cellular operators that can hardly deal with the traffic only with the cellular network, because the WLAN network uses the unlicensed band.

In other words, most cellular communication operators may build the WLAN network by themselves or may enter into partnership with the existing WLAN operator, thereby causing their own subscribers to receive communication services through a WLAN Access Point (AP) if the cellular communication operators can hardly accommodate the traffic of the subscribers only with the cellular evolved Node B (eNB) (also known as a cellular base station) like in the area where there is a lot of floating population.

The WLAN network that the communication operator has installed for traffic offloading is a network that originally has different characteristics from those of the cellular network. Therefore, the WLAN network may be insufficient to provide the mobility (handoff) or security that the communication operator can provide by installing the cellular eNB for the mobile communication subscribers. In addition to the basic method for installing the WLAN AP, the mobile communication operators have studied ways to provide mobile communication services to subscribers by directly using the cellular radio technology in the unlicensed band that is not licensed for the communication operators.

For reference, the term 'unlicensed band' as used herein may refer to a communication frequency band that is not licensed for a particular communication operator, and the unlicensed band is a shared band that is open to the public. The unlicensed band may be typically used as a band for industrial, science and medical communication. In addition to the WLAN (or Wireless Fidelity (Wi-Fi)), Bluetooth is the typical communication service that uses the unlicensed band.

For reference, the WLAN technology will be described below. The WLAN is used around the bands of 2.4 GHz and 5 GHz based on the Institute of Electrical and Electronics Engineers (IEEE) 802.11 standard. However, the trend is that the latest WLAN standards are designed around 5 GHz having a broader band, getting out of the band of 2.4 GHz that is currently overcrowding due to the narrowness of the whole band.

On the other hand, as for the WLAN channel, a channel of 20 MHz is defined as a basic channel, and as for the broadband channel, the band is extended in such a manner that channels of 40 MHz, 80 MHz, 160 MHz and the like are configured based on the basic channel of 20 MHz. In the IEEE 802.11n standard that uses a bandwidth of 40 MHz through channel bonding to maintain the backward compatibility with the IEEE 802.11a/b/g standard that was supporting only the bandwidth of up to 20 MHz in the past, a channel of 40 MHz is divided into a primary channel of a bandwidth of 20 MHz and a secondary channel of the remaining bandwidth of 20 MHz, and then maintained.

The IEEE 802.11ac standard supporting a broadband of up to 160 MHz (Optional 160 MHz, Mandatory 80 MHz) may also divide the whole band into a primary channel and a secondary channel and grant different roles thereto in a similar manner. For example, when a broadband of 80 MHz is used, a primary channel of 20 MHz is configured and Carrier Sense Multiple Access (CSMA)/Collision Avoidance (CA) is operated in the primary channel, and the remaining 60 MHz is operated as a secondary channel. However, among the 60 MHz, 20 MHz contiguous to the primary channel is referred to as a 'secondary-20 channel', and the remaining 40 MHz is referred to as a 'secondary-40 channel'. Even in the case of a broadband of 160 MHz (contiguous 160 or noncontiguous 80+80), the broadband is extended in the same manner and a 'secondary-80 channel' is defined and used.

FIG. 1 illustrates a relationship among a primary channel and a plurality of secondary channels in an IEEE 802.11 ac WLAN that is operated with 160 MHz according to the related art.

Referring to FIG. 1, the relationship among the primary channel and the plurality of secondary channels illustrates a primary channel 101, a secondary-20 channel 103, a secondary-40 channel 105 and a secondary-80 channel 107 in an IEEE 802.11ac WLAN that is operated with 160 MHz according to the related art is illustrated.

FIG. 2 illustrates a relationship among a primary channel and a plurality of secondary channels in an IEEE 802.11ac WLAN that is operated with 80+80 MHz according to the related art.

Referring to FIG. 2, the relationship among the primary channel and the plurality of secondary channels illustrates a primary channel 201, a secondary-20 channel 203, a secondary-40 channel 205 and a secondary-80 channel 207 in an IEEE 802.11ac WLAN that is operated with 80+80 MHz according to the related art is illustrated.

On the other hand, in IEEE 802.11n/ac or the WLAN standard that uses a channel bandwidth of 40 MHz or more, a primary channel and a secondary channel are used for different purposes. In the case of the IEEE 802.11n standard, a User Equipment (UE) (or an AP) desiring to transmit a Physical-layer Protocol Data Unit (PPDU) of 40 MHz performs channel contention (CSMA/CA) through the primary channel. In the channel contention process, just before a backoff counter expires, the UE (also known as a terminal or a mobile station (MS)) performs Clear Channel Assessment (CCA) to determine whether a secondary channel is busy or idle, for a certain period of time. The certain period of time is determined as Distributed InterFrame Space (DIFS) in the case of a band of 2.4 GHz, and as Point InterFrame Space (PIFS) in the case of a band of 5 GHz. As a result of the CCA, if the secondary channel is in an idle state, the UE may transmit a PPDU of 40 MHz using a primary channel and a secondary channel, but if the secondary channel is busy, the UE should transmit a PPDU of 20 MHz using only the primary channel, or restart the channel contention.

The IEEE 802.11ac standard also defines a similar channel access rule. For example, a UE desiring to transmit a PPDU of 160 MHz first performs channel contention in a primary channel depending on the standard, and just before a backoff counter expires, the UE performs CCA to determine whether a secondary-20 channel, a secondary-40 channel and a secondary-80 channel are in an idle state, during a PIFS time period. If the primary channel, the secondary-20 channel, the secondary-40 channel and the secondary-80 channel are all in the idle state, the UE may transmit the PPDU of 160 MHz. If the primary channel, the secondary-20 channel and the secondary-40 channel are all in the idle state, the UE may transmit a PPDU of 80 MHz. If the primary channel and the secondary-20 channel are all in the idle state, the UE may transmit a PPDU of 40 MHz. If only the primary channel is in the idle state, the UE may transmit a PPDU of 20 MHz. On the other hand, if the primary channel is busy, the UE should restart the channel contention by starting a backoff procedure.

Therefore, a need exists for a method and an apparatus for performing cellular communication using an unlicensed band in a cellular communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for performing cellular communication using an unlicensed band in a cellular communication system.

Another aspect of the present disclosure is to provide a method and an apparatus for selecting an unlicensed band using channel information of an unlicensed band in a cellular communication system.

Another aspect of the present disclosure is to provide a method and an apparatus for obtaining channel information of an unlicensed band in a cellular communication system.

Another aspect of the present disclosure is to provide a method and an apparatus for minimizing the interference caused by a device that uses an unlicensed band in a cellular communication system.

In accordance with an aspect of the present disclosure, a method for using at least one unlicensed band channel by an evolved Node B (eNB) in a cellular wireless communication system is provided. The method includes receiving unlicensed band channel information from at least one unlicensed band-enabled device that uses an unlicensed band channel, selecting the unlicensed band channel to be used for cellular communication based on the received unlicensed band channel information, and activating the selected unlicensed band channel.

In accordance with another aspect of the present disclosure, an eNB for using at least one unlicensed band channel in a cellular wireless communication system is provided. The eNB includes a transceiver configured to receive unlicensed band channel information from at least one unlicensed band-enabled device that uses an unlicensed band channel and a controller configured to select the unlicensed band channel to be used for cellular communication based on the received unlicensed band channel information, and activate the selected unlicensed band channel.

In accordance with another aspect of the present disclosure, a method for using at least one unlicensed band channel by a User Equipment (UE) in a cellular wireless communication system is provided. The method includes receiving unlicensed band channel information from an unlicensed band-enabled device that uses an unlicensed band channel, transmitting the received unlicensed band channel information to an eNB, receiving, from the eNB, information about a channel that is selected by the eNB based on the unlicensed band channel information, and configuring the unlicensed band channel to the eNB depending on the information about the selected channel.

In accordance with another aspect of the present disclosure, a UE for using at least one unlicensed band channel in a cellular wireless communication system is provided. The UE includes a transceiver configured to receive unlicensed band channel information from an unlicensed band-enabled device that uses an unlicensed band channel, transmit the received unlicensed band channel information to an eNB, receive, from the eNB, information about a channel that is selected by the eNB based on the unlicensed band channel information and a controller configured to configure the unlicensed band channel to the eNB depending on the information about the selected channel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
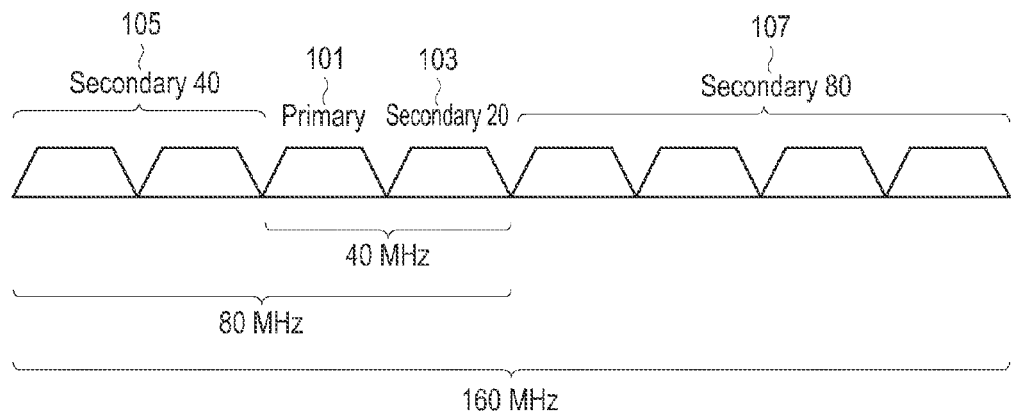
FIG. 1 illustrates a relationship among a primary channel and a plurality of secondary channels in an Institute of Electrical and Electronics Engineers (IEEE) 802.11ac Wireless Local Area Network (WLAN) that is operated with 160 MHz according to the related art.
Figure 2:
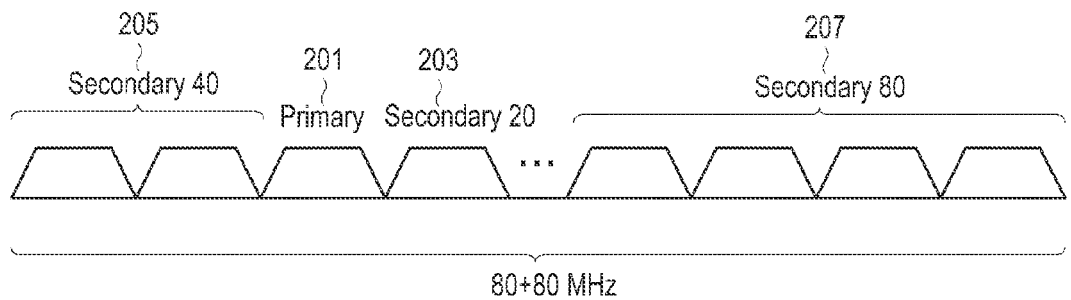
FIG. 2 illustrates a relationship among a primary channel and a plurality of secondary channels in an IEEE 802.11ac WLAN that is operated with 80+80 MHz according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A below-described embodiment of the present disclosure will be described with reference to, for example, a 3rd Generation Partnership Project (3GPP) Long Term Evolution (LTE)-based communication system. However, this is merely for convenience of description, and an embodiment of the preset disclosure is not limited to the 3GPP LTE-based communication system.

Prior to the detailed description of the present disclosure, the main concept of an embodiment of the present disclosure is as follows.

In an embodiment of the present disclosure, an evolved Node B (eNB) may obtain 'unlicensed band channel information' for a channel used by an unlicensed band-enabled device located near the eNB, such as a Wireless Local Area Network (WLAN) Access Point (AP) or Bluetooth. The eNB may select which one of multiple unlicensed band channels the eNB will use, using the obtained unlicensed band channel information, and perform communication with UEs in the selected unlicensed band channel, using a cellular communication method.

The main terms used herein are as follows.

The term 'scanning' refers to a process in which an eNB obtains unlicensed band channel information.

The term 'eNB scanning' refers to a process in which an eNB obtains unlicensed band channel information without help of a User Equipment (UE).

The term 'active eNB scanning' refers to a process in which during eNB scanning, an eNB requests unlicensed band channel information from an unlicensed band-enabled device and obtains the unlicensed band channel information in response thereto.

The term 'passive eNB scanning' refers to a process in which during eNB scanning, an eNB receives a message that an unlicensed band-enabled device transmits without request for the unlicensed band-enabled device, to obtain unlicensed band channel information.

The term 'UE scanning' refers to a process in which an eNB obtains unlicensed band channel information through a UE.

The term 'active UE scanning' refers to a process in which during UE scanning, a UE requests unlicensed band channel information from an unlicensed band-enabled device and obtains unlicensed band channel information in response thereto, and an eNB obtains the unlicensed band channel information from the UE.

The term 'passive UE scanning' refers to a process in which during UE scanning, a UE receives a message that an unlicensed band-enabled device transmits, without requesting unlicensed band channel information from the unlicensed band-enabled device, to obtain unlicensed band channel information, and an eNB obtains the unlicensed band channel information from the UE.

Various embodiments of the present disclosure will be described below.

Figure 3:
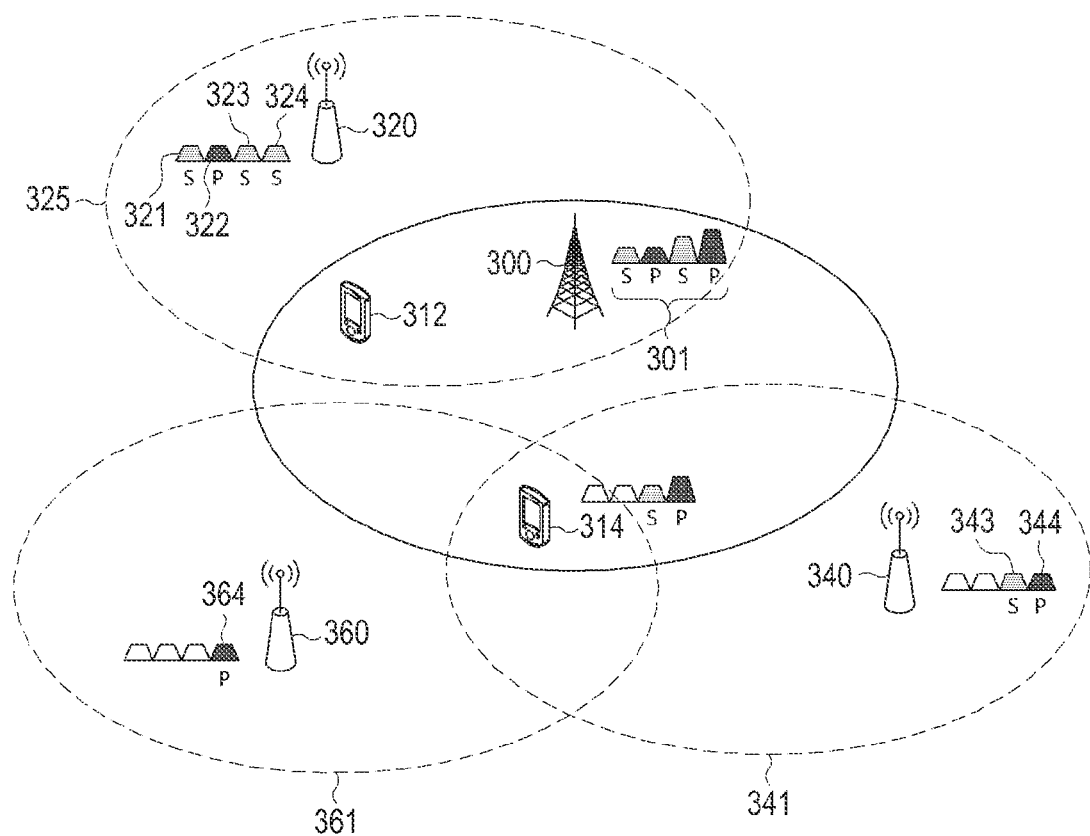
FIG. 3 illustrates how to configure an unlicensed band channel by a cellular evolved Node B (eNB) that uses an unlicensed band according to an embodiment of the present disclosure.

FIG. 3 illustrates how to configure an unlicensed band channel by a cellular eNB that uses an unlicensed band according to an embodiment of the present disclosure.

Referring to FIG. 3, it will be assumed that an eNB 300 can support an unlicensed band and receive a WLAN frame. In addition, it will be assumed that UEs 312 and 314 in FIG. 3 can be connected to the eNB 300 via a cellular interface, and to a WLAN AP via a WLAN interface. The WLAN AP is an example of an unlicensed band-enabled device that uses a channel of an unlicensed band, and the WLAN AP is illustrated for convenience of description.

On the other hand, it will be assumed that three WLAN APs 320, 340 and 360 are present in the vicinity of the eNB 300. In addition, for convenience of description, an unlicensed band will be assumed to include four channels of 20 MHz in an embodiment of the present disclosure.

The WLAN AP 320 is assumed to operate with a bandwidth of 80 MHz (20 MHz×4) based on the Institute of Electrical and Electronics Engineers (IEEE) 802.11ac standard. For convenience of description, four 20 MHz channels will be referred to as F1, F2, F3 and F4 in ascending order of frequency.

The WLAN AP 320 may use a primary channel F2 322, a secondary-20 channel F1 321, a secondary-40 channel F3 323 and a secondary-40 channel F4 324. In a coverage area 325 of the WLAN AP 320 there may exist the eNB 300 and the UE 312 connected to the eNB 300. Therefore, the eNB 300 may receive a WLAN frame that the WLAN AP 320 transmits, via the UE 312. On the other hand, in the blocks of F1 321, F2 322, F 323 and F 324, the primary channel is indicated by a dark shade, and the secondary channels are indicated by a pale shade. The height of each of the blocks 321~324 indicates channel utilization (BSS load) of each 20 MHz channel.

The WLAN AP 340 is assumed to operate with a bandwidth of 40 MHz based on the IEEE 802.11n standard, and the WLAN AP 340 uses F4 344 as a primary channel and F3 343 as a secondary channel. In a coverage area 341 of the WLAN AP 340 there may exist the UE 314 connected to the eNB 300. Therefore, the UE 314 may receive a WLAN frame that the WLAN AP 340 transmits, and deliver the received WLAN frame to the eNB 300. Similarly, in the blocks of F3 343 and F4 344, the primary channel is indicated by a dark shade, and the secondary channel is indicated by a pale shade. In addition, F1 and F2 in which no channel is configured are indicated without shading. The height of each of the blocks 343 and 344 indicates channel utilization (BSS load) of each 20 MHz channel.

The WLAN AP 360 is assumed to operate with a bandwidth of 20 MHz based on the IEEE 802.11a standard, and the WLAN AP 360 uses F4 364 as a primary channel. In a coverage area 361 of the WLAN AP 360 there may exist the UE 314 connected to the eNB 300. Therefore, the UE 314 may receive a WLAN frame that the WLAN AP 360 transmits, and deliver the received WLAN frame to the eNB 300. Similarly, in the block of F4 364, the primary channel is indicated by a dark shade, and F1, F2 and F3 in which no channel is configured are indicated without shading. The height of the block 364 indicates channel utilization (BSS load) of a 20 MHz channel.

Since the eNB 300 can obtain channel information of the WLAN AP 320 directly from the WLAN AP 320, or obtain channel information of the WLAN APs 340 and 360 via the UE 314, the eNB 300 may obtain channel information of all the WLAN APs 320, 340 and 360 that affect the coverage area of the eNB 300 as shown by reference numeral 301. In other words, reference numeral 301 shows the existences of a WLAN AP that uses F1 as a secondary channel, a WLAN AP that uses F2 as a primary channel, a WLAN AP that uses F3 as a secondary channel, and a WLAN AP that uses F4 as a primary channel. In addition, reference numeral 301 shows that channel utilization of F3 is higher than channel utilizations of F1 and F2, and channel utilization of F4 is higher than channel utilizations of F3. However, it can be seen that such information is the same as a sum of channel information of the WLAN APs 320, 340 and 360.

In an embodiment of the present disclosure, since a WLAN AP is a typical example of an unlicensed band-enabled device (or a device that uses an unlicensed band), channel information of the WLAN AP is 'unlicensed band channel information'. The 'unlicensed band channel information' may include 'unlicensed band channel configuration information' and 'unlicensed band channel usage information'.

The unlicensed band channel configuration information may include information indicating whether there is an unlicensed band-enabled device that is set for the unlicensed band channel, and information (e.g., indicating whether the configured channel is a primary channel or a secondary channel) about the type of the configured channel. For example, if the unlicensed band-enabled device is a WLAN device, the unlicensed band channel configuration information may include information indicating whether there is a WLAN device that is set for the channel, and information indicating whether the type of the configured channel is a primary channel, a secondary-20 channel, a secondary-40 channel or a secondary-80 channel. On the other hand, the unlicensed band channel usage information may include information about the number of UEs that are using the channel, and information about the channel utilization (e.g., the ratio of the time that is being used by the channel to the total measurement time).

For convenience of description, 'unlicensed band channel information' may be abbreviated to 'channel information', 'unlicensed band channel configuration information' may be abbreviated to 'channel configuration information', and 'unlicensed band channel usage information' may be abbreviated to 'channel usage information'.

Figure 4:
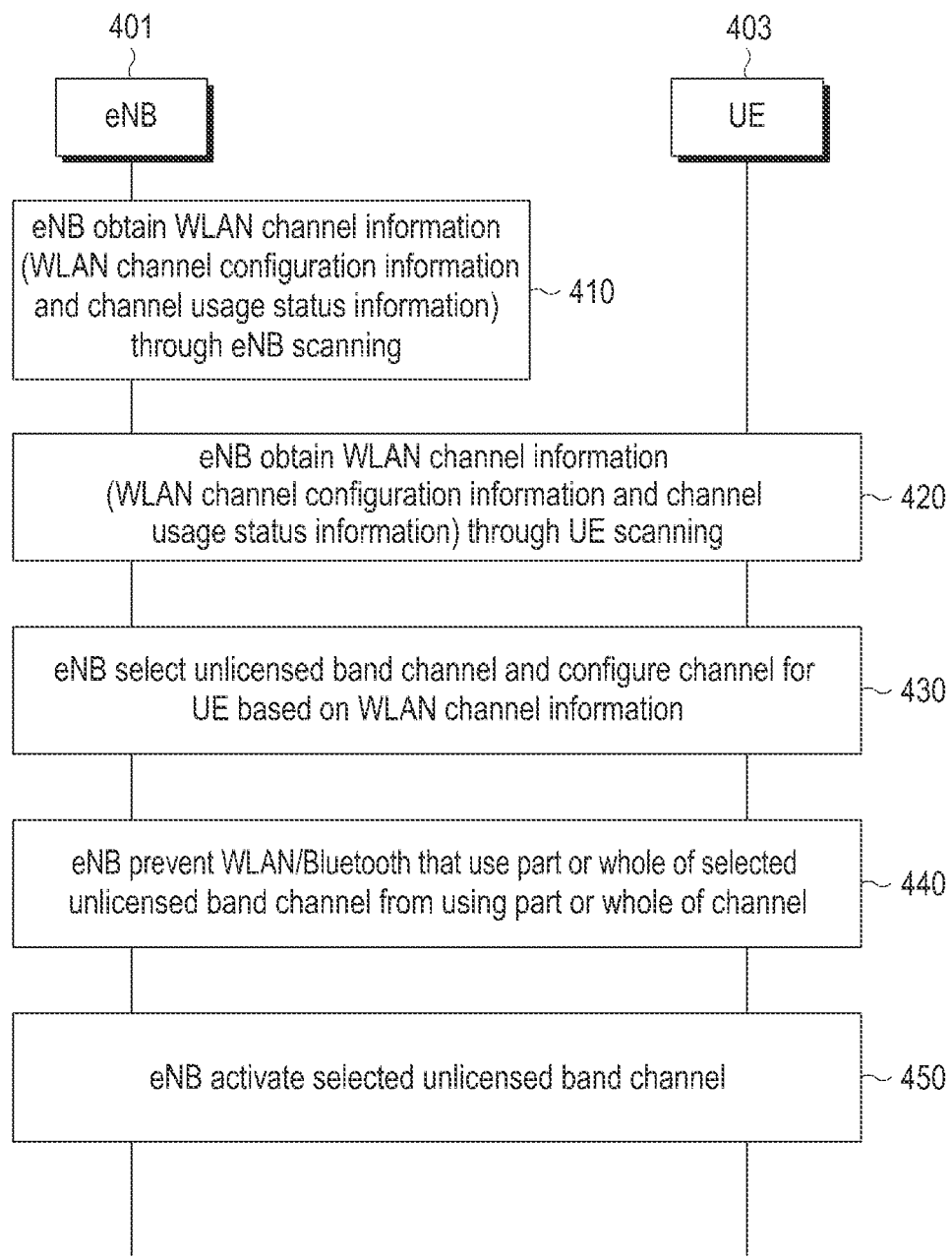
FIG. 4 schematically illustrates a process of selecting an unlicensed band to be used by a cellular eNB according to an embodiment of the present disclosure.

FIG. 4 schematically illustrates a process of selecting an unlicensed band to be used by a cellular eNB according to an embodiment of the present disclosure.

Referring to FIG. 4, in a description of the process according to an embodiment of the present disclosure, the process may be divided into five operations. However, operations 420 and 440 shown by a dotted line in FIG. 4 may be omitted depending on the capability of the eNB or the UE, or on the decision by the eNB. Each of the five operations will be described below.

In operation 410, an eNB 401 may obtain channel information of a WLAN AP. In other words, operation 410 may correspond to an 'eNB scanning' process. As described above, a process in which the eNB 401 obtains channel information of the WLAN AP independently without help of a UE 403 will be referred to as 'eNB scanning', and a process in which the eNB 401 obtains channel information of the WLAN AP with help of the UE 403 will be referred to as 'UE scanning' The eNB scanning will be described below.

The eNB 401 may determine to configure a new unlicensed band's channel, if the required amount of traffic in the eNB coverage area is insufficient to provide a service only with the frequency band licensed for the eNB 401, or if the eNB 401 cannot accommodate all of the current traffic only with the unlicensed band's channel (or carrier) that is already in use. Accordingly, the eNB 401 may obtain channel information of the WLAN AP located in the vicinity of the eNB 401, through a transceiver having a WLAN interface that is included in the eNB 401. The channel information of the WLAN AP may include channel configuration information and channel usage status information of the WLAN AP. On the other hand, the eNB scanning may be divided into 'active eNB scanning' in which an eNB first requests channel information from an WLAN AP, and then receives a response thereto from the WLAN AP, and 'passive eNB scanning' in which an eNB receives a message that an WLAN AP transmits without request for the channel information, to obtain channel information.

Unlike in operation 410 for eNB scanning, in operation 420, the eNB 401 may obtain channel information of the WLAN AP through the UE 403. As described above, operation 420 will be referred to as 'UE scanning'. The eNB 401 may determine to obtain channel information of the WLAN AP through the UE 403, if the eNB 401 can obtain channel information of the eNB 401's nearby WLAN AP as the UE 403 has a WLAN interface. In this case, the eNB 401 may start a procedure for obtaining channel information of the WLAN AP through the UE 403. However, operation 420 may be omitted as described above. On the other hand, the UE scanning may be divided into 'active UE scanning' in which a UE first requests channel information from a WLAN AP, and then receives a response thereto from the WLAN AP, and 'passive UE scanning' in which a UE receives a message that a WLAN AP transmits without UE's request, to obtain channel information.

In above-described operation 410, the eNB may obtain channel information of the WLAN AP without help of the UE, through eNB scanning. However, the eNB may obtain channel information of the WLAN AP once again through UE scanning in operation 420, and the reason is as follows.

If an arbitrary WLAN AP is far away from the eNB 401, the eNB 401 may not receive a WLAN frame that the WLAN AP transmits. Therefore, the eNB 401 may not obtain channel information of the WLAN AP. However, if the UE 403 is located in the area that is included in both the coverage area of the eNB 403 and the coverage area of the WLAN AP, and the UE 403 has a WLAN interface, the UE 403 may deliver the channel information of the WLAN AP to the eNB 401. Therefore, in operation 420, the eNB 401 may request the UE 403 to report the channel information of the WLAN AP that is far away from the eNB 401, and in response thereto, the UE 403 obtain channel information of the WLAN AP and deliver the obtained channel information to the eNB 401.

By synthesizing the channel information obtained in operations 410 and 420, the eNB may obtain channel information from more WLAN APs, so the eNB may select an optimal unlicensed band channel that the eNB will use for cellular communication, while minimizing the interference by the WLAN APs. Therefore, in operation 430, the eNB 401 may select an optimal unlicensed band's channel with minimized interference based on the channel information of the WLAN AP, which is obtained in operations 410 and 420, and announce the selected channel to the UE 403 to configure an unlicensed band channel to be used cellular communication between the eNB 401 and the UE 403.

On the other hand, in an embodiment of the present disclosure, the eNB may set a weight for each channel depending on the characteristics of the unlicensed band channel using the unlicensed band channel information, and configure a channel with the minimum set weight as an unlicensed band channel to be used for cellular communication. For example, the eNB may grant a weight value for each channel by synthesizing the 'channel configuration information' indicating whether the channel is used as a primary channel or a secondary channel in the WLAN AP, and the 'channel usage information' indicating utilization of the channel, such as the number of UEs connected to the channel.

In other words, the eNB may grant a higher weight to the channel that is used as a primary channel, and a lower weight to the channel that is used as a secondary channel. In addition, the eNB may grant a higher weight to the higher-utilization channel, and a lower weight to the lower-utilization channel. By doing so, the eNB may set a weight for the channel taking into account both of the information indicating whether the channel is a primary channel or a secondary channel and the information indicating the channel utilization, since even the channel that is used as a primary channel may be a lower-utilization channel and even the channel that is used as a secondary channel may be a higher-utilization channel. Depending on the set channel-specific weight, the eNB may select an unlicensed band channel whose interference by the existing unlicensed band-enabled devices (e.g., a WLAN AP or a Bluetooth master) is minimized, and perform cellular communication with the UE 403 using the selected unlicensed band channel.

In operation 440, if the eNB 401 transmits and receives data to/from the UE 403 through the unlicensed band channel that is selected in operation 430, the eNB 401 may prevent a device of another radio technology from using a part or whole of the selected unlicensed band channel in order to protect the unlicensed band channel from the interference by the device of another radio technology (e.g., WLAN and the like) that uses the same band as a part or whole of the selected unlicensed band channel.

In other words, the eNB 401 may prevent wireless devices of another unlicensed band that uses the channel that was selected before the eNB 401 communicates with the UE by activating the selected unlicensed band channel, from using a part or whole of the channel. This may be done if the UE 403 connected to the eNB 401 can transmit a channel blocking message (e.g., a 40 MHz Intolerant Bit Report (IBR) of IEEE 802.11n WLAN, or an Adaptive Frequency Blacklist Report (AFBR) of Bluetooth) as the UE 403 includes an interface that is based on a radio technology of another unlicensed band. However, as described above, operation 440 may be omitted, since operation 440 is optional in an embodiment of the present disclosure.

In operation 450, the eNB 401 may activate the selected unlicensed band's channel. In other words, the eNB 401 may activate the configured unlicensed band channel if the eNB 401 desires to transmit and receive traffic through the configured unlicensed band's channel. For this activation, the eNB 401 may transmit a — (MAC) control element to the UE 403 to activate the channel, thereby configuring the channel between the eNB 401 and the UE 403.

As described above, operations 420 and 440 in dashed blocks of FIG. 4 may be omitted depending on the decision by the eNB or the capability of the UE. Therefore, in accordance with FIG. 4, operations by combinations of 410→430→450, 410→420→430→450, and 410→430→440→450 may be performed.

Figure 5A:
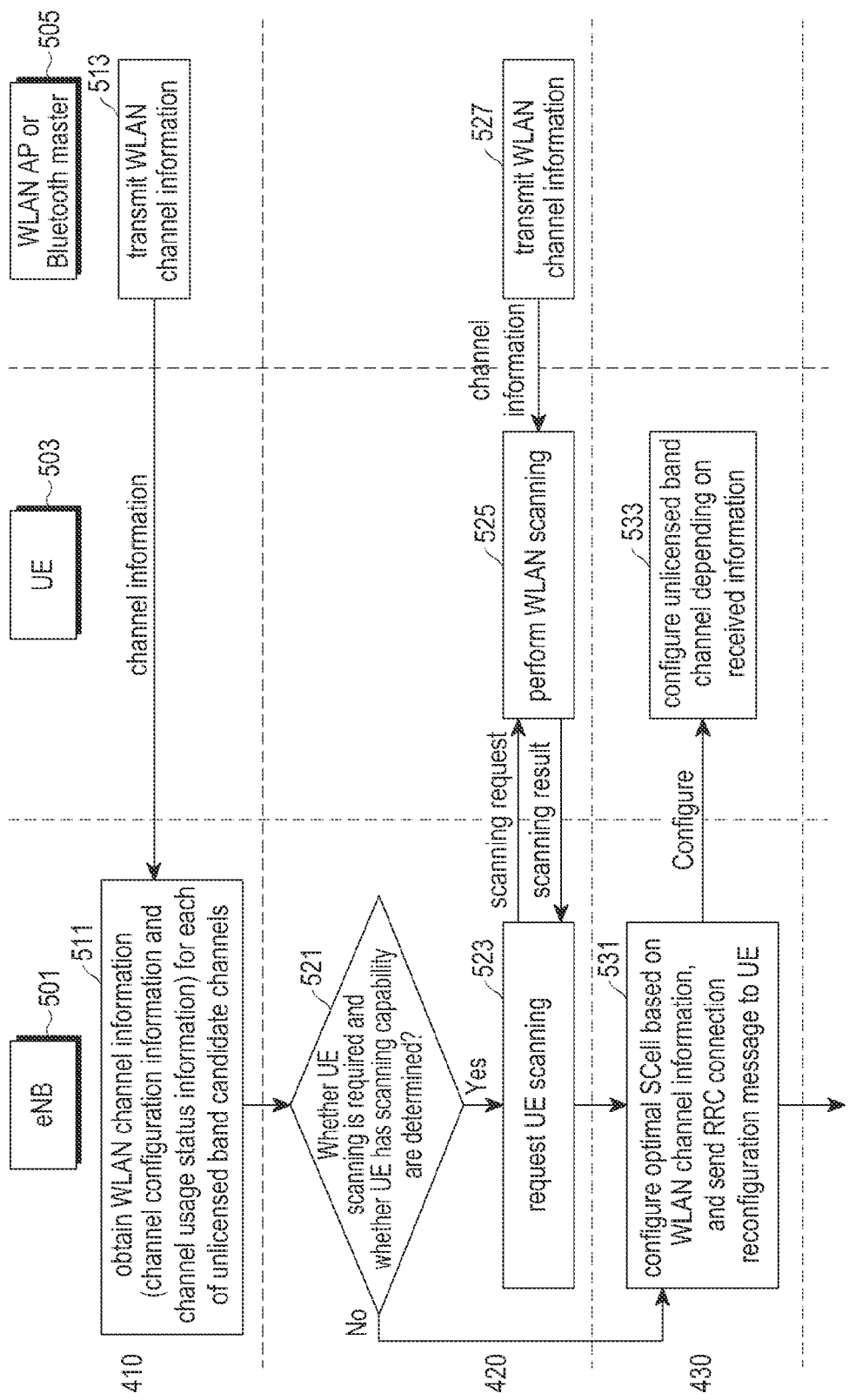
FIGS. 5A and 5B illustrate a process of selecting an unlicensed band to be used by a cellular eNB according to various embodiments of the present disclosure.
Figure 5B:
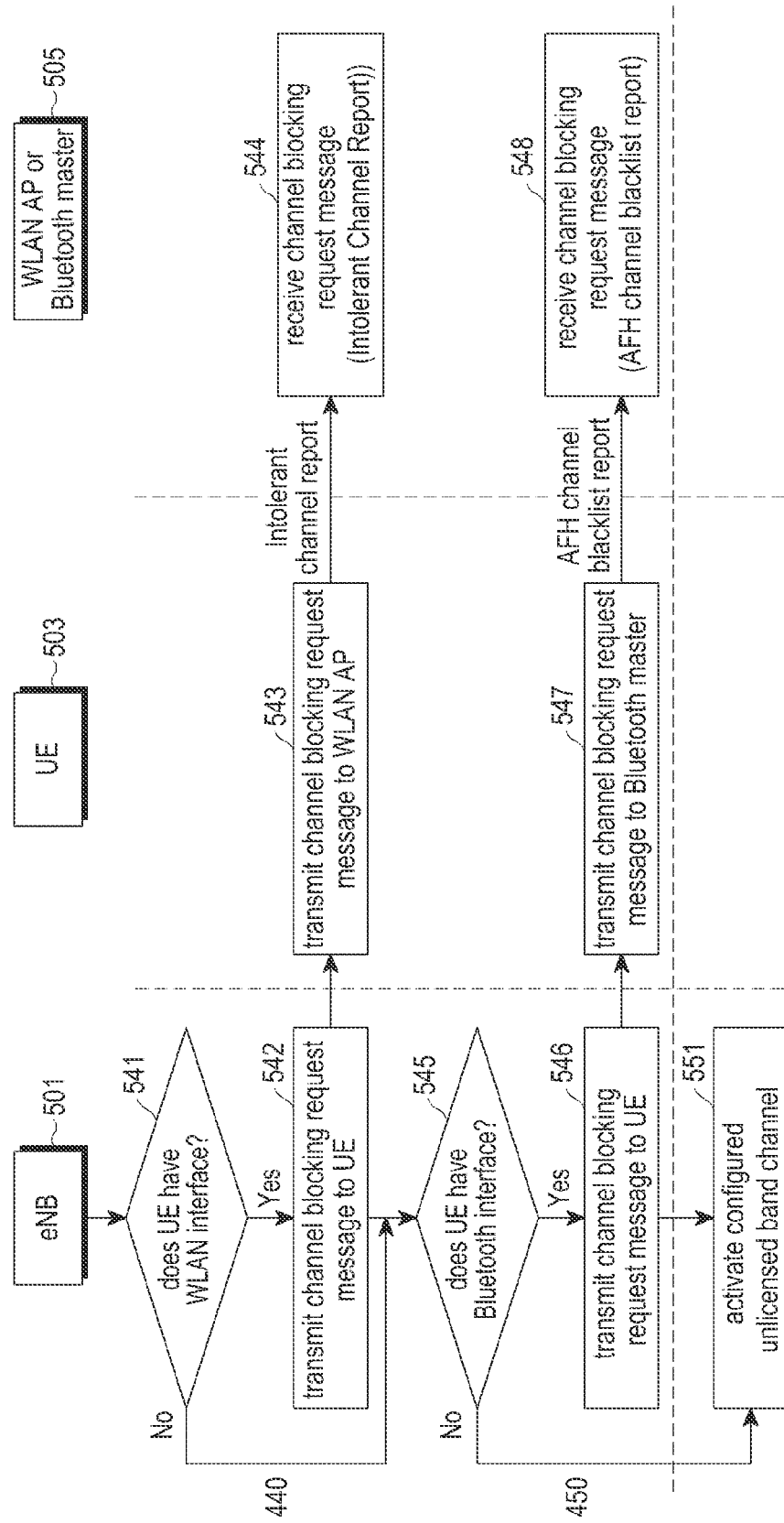

FIGS. 5A and 5B illustrate a process of selecting an unlicensed band to be used by a cellular eNB according to various embodiments of the present disclosure.

Referring to FIGS. 5A and 5B, the vertical dotted lines are to divide operations of an eNB 501, a UE 503 and a WLAN AP or Bluetooth master 505. The WLAN AP or Bluetooth master 505 may operate as an anchor like a WLAN AP or Bluetooth master in a communication service that uses an unlicensed band, since the WLAN AP or Bluetooth master 505 is for representing an example of a communication service that uses an unlicensed band. However, the WLAN AP or Bluetooth master 505 may be either one of the two components depending on the description of each operation in FIG. 5A.

On the other hand, horizontal dotted lines are to match operations in FIGS. 5A and 5B to corresponding operations in FIG. 4. For example, operations 511 and 513 in FIG. 5A may correspond to an operation of eNB scanning described in operation 410 of FIG. 4. For reference, although one UE 503 and one WLAN AP or Bluetooth master 505 are illustrated in FIGS. 5A and 5B, the eNB 501 may perform a channel configuration procedure with multiple UEs and multiple unlicensed band-enabled service anchors like multiple WLAN APs (or Bluetooth masters). The process of FIGS. 5A and 5B will be described below.

In operation 511, the eNB 501 may measure each of candidate channels of an unlicensed band to obtain channel information (e.g., channel configuration information and channel usage status information) for each of the candidate channels.

The channel configuration information may include information indicating whether there is a WLAN primary channel configured in the channel, and information about the number of primary channels. On the other hand, the channel usage status information may include information about the number of WLAN UEs that are using the channel, and information about the ratio of the time that is being used by the channel to the total measurement time.

In operation 513, the channel configuration information and the channel usage status information may be transmitted to the eNB 501 by the WLAN AP 505. For reference, although the channel configuration information may be transmitted in the form of a certain frame, the channel configuration information may be transmitted especially through a beacon frame defined in the IEEE 802.11 standard. For reference, the beacon frame will be described with reference to FIGS. 6 and 7.

Figure 6:
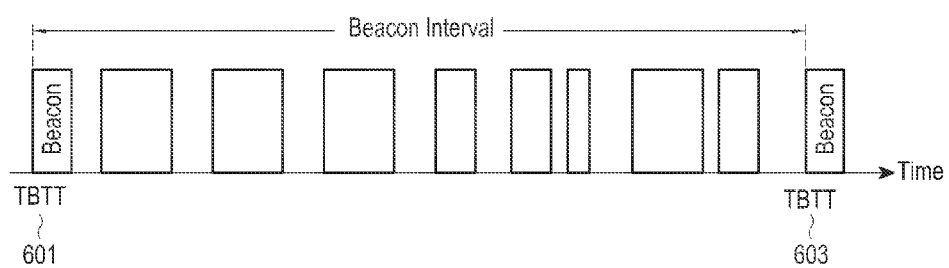
FIG. 6 illustrates how to periodically broadcast a beacon frame by a WLAN Access Point (AP) according to an embodiment of the present disclosure.

FIG. 6 illustrates how to periodically broadcast a beacon frame by a WLAN AP according to an embodiment of the present disclosure.

Referring to FIG. 6, the IEEE 802.11 standard provides that a WLAN AP broadcasts a beacon frame including system configuration information at regular intervals, in order for a UE to select a WLAN AP and attempt to access the WLAN AP when the UE first desires to access a WLAN AP. The timing at which the beacon frame is transmitted will be referred to as Target Beacon Transmission Times (TBTTs) 601 and 603.

Figure 7:
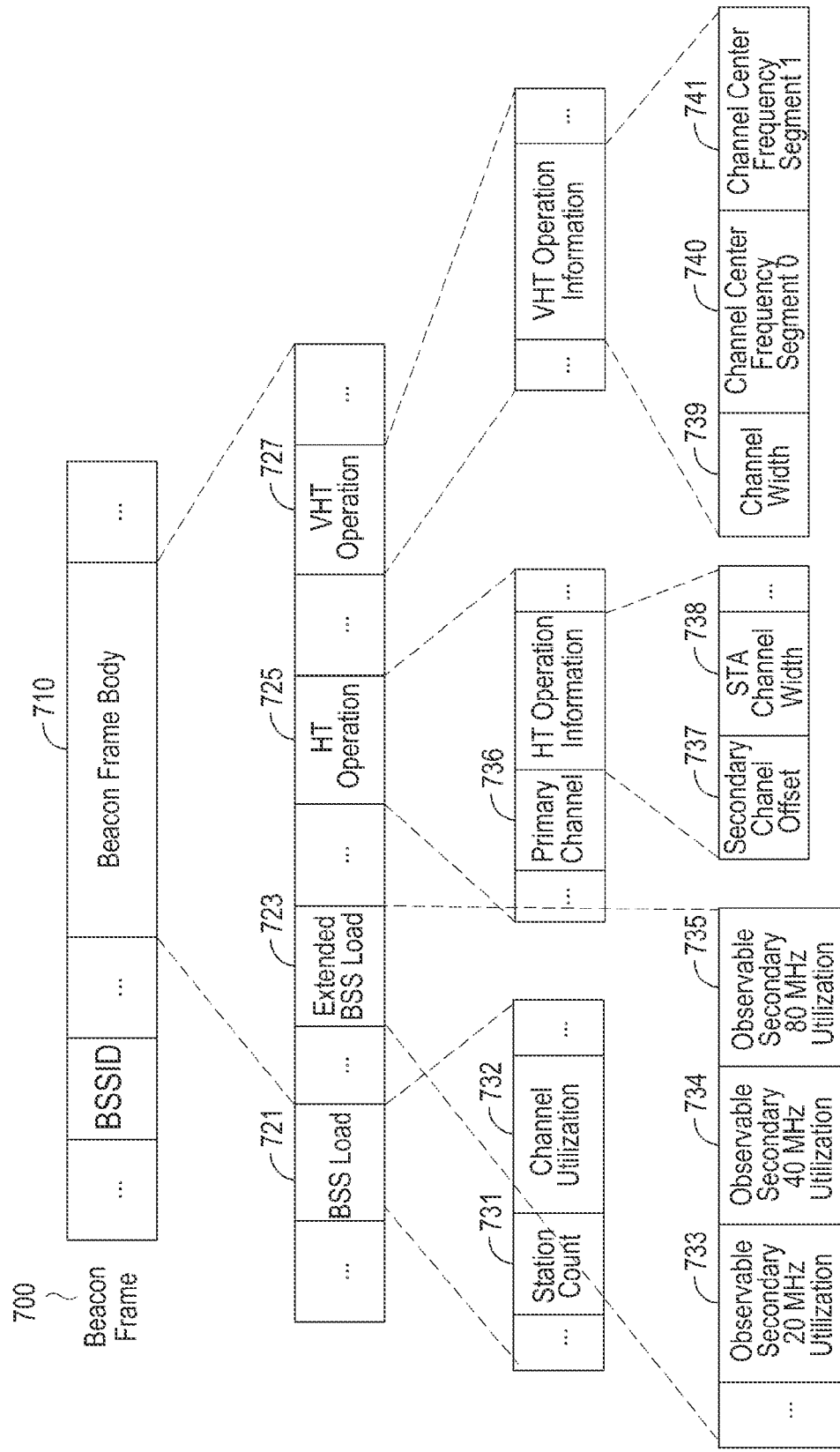
FIG. 7 illustrates how to configure information elements when the information elements constituting a beacon frame of the WLAN standard are used as channel configuration information and channel usage information according to an embodiment of the present disclosure.

FIG. 7 illustrates how to configure information elements when the information elements constituting a beacon frame of the WLAN standard are used as channel configuration information and channel usage information according to an embodiment of the present disclosure.

Referring to FIG. 7, a Beacon Frame Body 710 may include various Information Elements (IEs). Among them, IEs, such as a BSS Load 721, an Extended BSS Load 723, an HT Operation 725, and a VHT Operation 727 may be used in an embodiment of the present disclosure.

The IE of BSS Load 721 may include information, such as a "Station Count" field 731, indicating the number of UEs that are currently connected to the WLAN AP, and a "Channel Utilization" field 732 indicating the ratio of the time that is being used by the WLAN AP to the total measurement time for the primary channel.

The IE of Extended BSS Load 723 may include an "Observable Secondary 20 MHz Utilization" field 733, an "Observable Secondary 40 MHz Utilization" field 734, and an "Observable Secondary 80 MHz Utilization" field 735. Each of the above fields (for Observable Secondary W MHz Utilization) indicates the ratio of the time that is being used by the WLAN AP to the total measurement time in a secondary channel (for Secondary W MHz) having a size of W MHz.

The eNB 501 may obtain channel usage status information for each of a primary channel and secondary channels, upon receiving the IE of BSS Load 721 and the IE of Extended BSS Load 723, which are included in a beacon frame 700 that the WLAN AP 505 broadcasts periodically.

On the other hand, the IE of HT Operation 725 may include information, such as a "Primary Channel" field 736, indicating a channel number of the primary channel, a "Secondary Channel Offset" subfield 737 indicating an offset value that is a relative position for the primary channel of the secondary channel, and a "STA Channel Width" subfield 738 indicating a bandwidth of the operating channel.

The IE of VHT Operation 727 may include information, such as a "Channel Width" subfield 739, indicating a bandwidth of the operating channel, a "Channel Center Frequency Segment 0" subfield 740 indicating the center frequency for a 80/160 MHz channel or the center frequency of a segment-0 channel for a 80+80 MHz channel, and a "Channel Center Frequency Segment 1" subfield 741 indicating the center frequency of a segment-1 channel for a 80+80 MHz channel.

The eNB 501 may obtain channel configuration information, such as the unique numbers of the primary channel and secondary channel used by the WLAN AP, and the total bandwidth, by analyzing the IE of HT Operation 725 and the IE of VHT Operation 727, which are included in the beacon frame 700 transmitted by the WLAN AP 505.

On the other hand, the eNB according to an embodiment of the present disclosure may receive a beacon frame broadcasted by the WLAN AP and determine the contents of the received beacon frame. This may be implemented by adding a function block for receiving a WLAN frame to a cellular receiver of the eNB or providing a separate WLAN reception device, and then handling the reception through internal communication with the cellular receiver.

However, although the eNB may, as described above, obtain the channel information from the beacon frame that the WLAN AP broadcasts periodically, the eNB may individually, in some cases, measure a channel state of the WLAN channel without receiving a beacon frame, to obtain channel information from the channel usage status information and/or channel interference level information.

The eNB scanning in operations 511 and 513, which have been described so far, will be described with reference to FIGS. 11 and 12. Active eNB scanning will be described with reference to FIG. 11, and passive eNB scanning will be described with reference to FIG. 12.

Upon obtaining the channel information for each of candidate channels of the unlicensed band in operation 511 as described above, the eNB may select an unlicensed band channel in which the interference by the WLAN AP can be minimized, based on the obtained channel information.

A method for selecting an optimal unlicensed band channel using the unlicensed band channel information in an embodiment of the present disclosure will now be described below.

The eNB 501 may grant a weight to the channel usage status using the channel information (channel configuration information and channel usage status information) for each of the channels of a 20 MHz band, which is obtained from the beacon frame received from the WLAN AP 505.

The weight may be determined taking into account not only whether a primary channel and/or secondary channels (e.g., a secondary-20 channel, a secondary-40 channel and the like) of the channel are configured, but also the factors, such as the size of Max. Transmission Power allowed for the channel, and Dynamic Frequency Selection (DFS) and Transmit Power Control (TPC) of the channel.

The concept of selecting a channel by setting a weight in an embodiment of the present disclosure is as follows.

In order to select a channel using the channel information, 'Weighted Channel Utilization (WCU)' may be defined. The term 'weighted channel utilization' refers to value determined by reflecting the properties of the channel in the utilization of the channel by weight, and specifically, the weighted channel utilization may be defined as a product of the weight of the channel configuration information and the weight corresponding to the channel usage status information. As a simple example, a WLAN AP1 uses an F1 channel as a primary channel, and two UEs are connected to the F1 channel. A WLAN AP3 uses an F2 channel as a secondary channel, and five UEs are connected to the F2 channel. In this case, if a weight of 10 is granted to the primary channel, a weight of 5 is granted to the secondary channels, and a weight corresponding to the number of UEs are set, the weighted channel utilization of the F1 channel is 10×2=20, and the weighted channel utilization of the F2 channel is 5×5=25. Therefore, the interference is highly likely to be lower, since the weighted channel utilization value (=20) of the F1 channel is less than the weighted channel utilization value (=25) of the F2 channel. In this case, therefore, even though F1 is used as a primary channel, it may be more efficient for the eNB to select the F1 channel and use the selected F1 channel for cellular communication. However, a weight value corresponding to whether the primary/secondary channels are configured, and a weight value corresponding to the number of connected UEs should be experimentally determined in advance.

A process of selecting a channel using the unlicensed band channel information will be described with reference to FIG. 8 based on the above concept.

Figure 8:
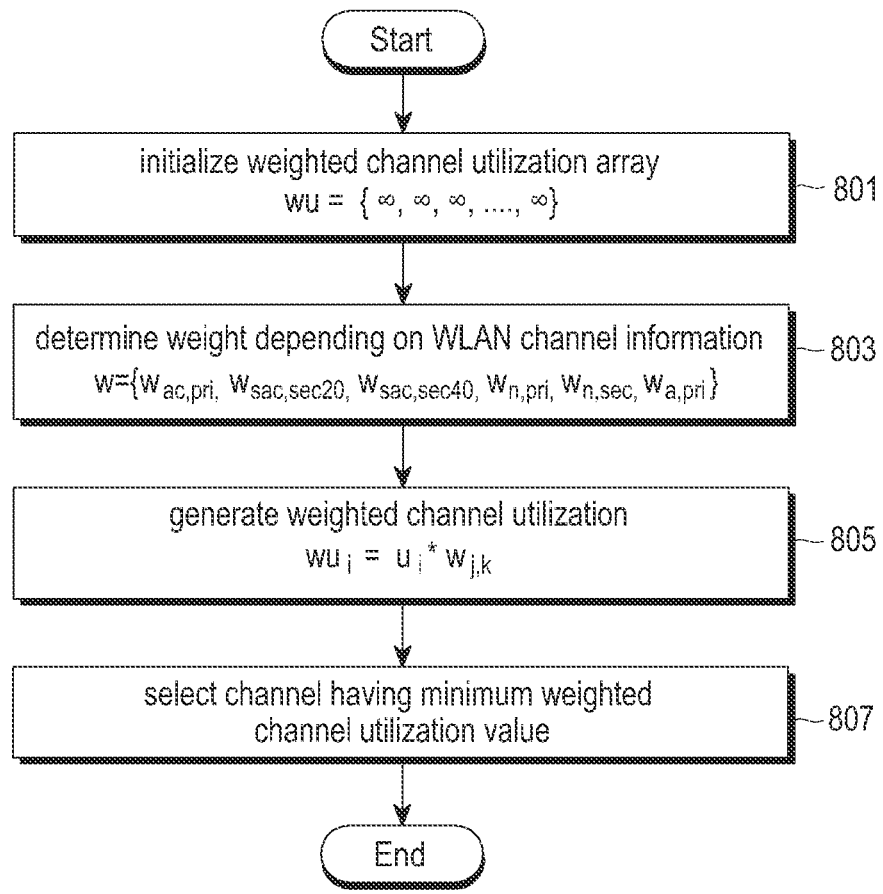
FIG. 8 illustrates a method of selecting an unlicensed band channel to be used for cellular communication using channel information according to an embodiment of the present disclosure.

FIG. 8 illustrates a method of selecting an unlicensed band channel to be used for cellular communication using unlicensed band channel information according to an embodiment of the present disclosure.

Referring to FIG. 8, in operation 801, the eNB may initialize an array for storing the weighted channel utilization.

In operation 803, the eNB may determine a weight wu corresponding to the channel properties. The channel properties may be obtained from channel configuration information. In the above example, a weight of a primary channel is set to 10 and a weight of a secondary channel is set to 5.

The following example is possible based on the actual system bandwidth. The eNB may set a weight $w_{ac,pri}$ to 8, if the channel is a primary channel in an IEEE 802.11ac-based WLAN AP with a band of 80 MHz, the eNB may set a weight $w_{ac,sec20}$ to 4, if the channel is operated as a secondary-20 channel, and the eNB may set a weight $w_{ac,sec40}$ to 2, if the channel is operated as a secondary-40 channel. In addition, the eNB may set a weight $w_{n,pri}$ to 4, if the channel is a primary channel in an IEEE 802.11n-based WLAN AP that is operated with a bandwidth of 40 MHz, and the eNB may set a weight $w_{n,sec}$ to 2, if the channel is a secondary channel. Further, the eNB may set a weight $w_{a,pri}$ to 2, if the channel is a primary channel in an IEEE 802.11a-based WLAN AP that is operated with a bandwidth of 20 MHz.

In operation 805, the eNB may generate the weighted channel utilization wu, by multiplying the weight corresponding to the channel configuration information, which is determined in operation 803, by the channel utilization. The channel utilization may be obtained by the channel usage information.

In operation 807, the eNB may select a channel having the smallest one of the weighted channel utilization values $wu_i$ stored in the weighted channel utilization array, as an optimal channel to be used for cellular communication.

An operation of UE scanning described in operation 420 of FIG. 4 will be described below with reference to operations 521 to 527 in FIG. 5A.

Referred back to FIG. 3, while the WLAN AP 340 or the WLAN AP 360 is located outside the coverage area of the eNB 300, the UE 314 connected to the eNB 300 is located in the coverage area of the AP of the eNB 300. Therefore, while the UE 314 can receive a beacon frame from the WLAN AP 340 or the WLAN AP 360, the eNB 300 cannot receive the beacon frame broadcasted by the WLAN AP 340 or the WLAN AP 360. Therefore, in order for the eNB 300 to perform channel configuration more efficiently, the UE 314 may be configured to receive the beacon frame broadcasted by the WLAN AP 340 or the WLAN AP 360, and report the received beacon frame to the eNB 300. The operation is as follows.

First, in operation 521, the eNB 501 may determine whether UE scanning is required and whether the UE has the scanning capability. The scanning capability may be implemented by adding a function block for receiving a WLAN frame to a cellular receiver of the UE 503 or providing a separate WLAN reception device, and then handling the reception through internal communication with the cellular receiver.

If UE scanning is not required or the UE does not have the scanning capability, the eNB 501 may proceed to operation 531. On the other hand, if UE scanning is required and the UE has the scanning capability, the eNB 501 may transmit a channel information request message to the UE 503 to request WLAN scanning in operation 523. In other words, the eNB 501 may request the UE 503 to obtain channel information of the eNB 501's nearby WLAN AP and report the obtained channel information to the eNB 501. In this case, the eNB 501 may request only the UE located in the coverage area of the unlicensed band channel to perform UE scanning, due to the mismatch between the coverage area of the cellular band and the coverage area of the unlicensed band. This is a method for minimizing the waste of uplink resources of the UE by requesting only the UEs located in the coverage area of the unlicensed band to perform UE scanning. This will be described with reference to FIGS. 9 and 10.

Upon receiving this request, the UE 503 may perform WLAN scanning in operation 525. In other words, in operation 525, the UE 503 may obtain WLAN channel information from the beacon frame that the WLAN AP 505 broadcasts periodically (as shown in operation 527), and then report the obtained channel information to the eNB 501. The method of obtaining channel information by the UE is the same as the above-described method performed by the eNB. In other words, 'active UE scanning' and 'passive UE scanning' are both possible. These scanning methods have been described in the description of the eNB scanning method, so a description thereof will be omitted.

The eNB 501 may select an unlicensed band channel using more channel information, since the eNB 501 has obtained channel information from the UE 503 in addition to the WLAN channel information that the eNB 501 has obtained individually in operation 511.

On the other hand, in operation 523, the eNB 501 has requested the UE 503 to report the channel information, and in this regard, the eNB 501 should select the UE that the eNB 501 will request to report the channel information. In other words, if the eNB 501 requests all the UEs located in the eNB 501's coverage area to report the channel information, even the UEs that are not located in the unlicensed band communication coverage area may perform an operation of obtaining unlicensed band channel information, and then make a report that they have failed to obtain unlicensed band channel information, causing unnecessary use of the resources. Therefore, it is efficient to request only the UEs located in the unlicensed band communication coverage area to report the unlicensed band channel information.

In the following description, a method of allowing an eNB to determine whether a UE is located in the unlicensed band communication coverage area of the eNB will be divided into Carrier Aggregation (CA)-based method (shown in FIG. 9) and a Dual Connectivity (DC)-based method (shown in FIG. 10).

Figure 9:
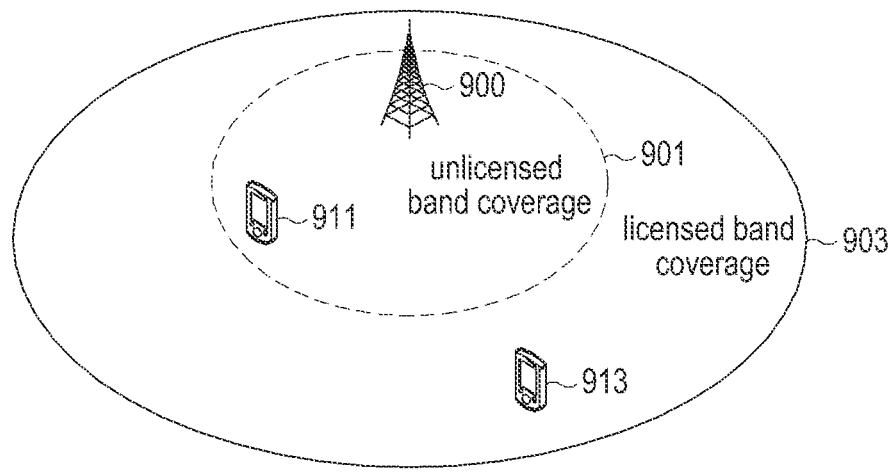
FIG. 9 illustrates a method of determining whether a User Equipment (UE) is located in unlicensed band communication coverage area of an eNB in a Carrier Aggregation (CA) method according to an embodiment of the present disclosure.

FIG. 9 illustrates a method of determining whether a UE is located in unlicensed band communication coverage area of an eNB in a CA method according to an embodiment of the present disclosure.

Referring to FIG. 9, the CA method is a method in which one eNB uses two channels (or carriers) under the assumption that one UE is connected only to one eNB. It is assumed in FIG. 9 that in accordance with the CA method, an eNB 900 uses a channel of a licensed band for a primary cell (PCell), and uses an unlicensed band channel for a secondary cell (SCell). In FIG. 9, coverage area of the primary cell that uses the licensed band channel is represented by reference numeral 903, and coverage area of the secondary cell that uses the unlicensed band channel is represented by reference numeral 901.

On the other hand, typically, transmission power of the unlicensed band channel may be limited to a certain range. Accordingly, the coverage area 901 of the unlicensed band of the eNB 900 may be included in the coverage area 903 of the licensed band, and the eNB 900 may approximately estimate the size of the coverage area 901 of the unlicensed band.

The eNB 900 may use the following method to determine whether an arbitrary UE 911 is in the coverage area 901 of the unlicensed band.

The eNB 900 may use the signal strength of a Sounding Reference Signal (SRS) that a UE 913, an unlicensed band for which is activated, transmits on an uplink of the licensed band. The SRS is a reference signal that the UE 911 transmits to the eNB, and the SRS is provided that the UE 911 transmits the SRS with certain fixed transmission power. Therefore, if the eNB 900 receives the SRS that the UE 913 has transmitted over an uplink channel of the licensed band, and measures the signal strength of the received SRS, the eNB 900 may estimate how far the UE 913 is away from the eNB 900. Eventually, the eNB 900 may estimate the location of the UE 913 by measuring the received signal strength of the SRS. Since the coverage area 901 of the secondary cell, the unlicensed band for which is set, is approximately estimated, the eNB 900 may determine from the received signal strength whether the UE 911 is located in the coverage area 901 of the secondary cell, the unlicensed band for which is set.

Figure 10:
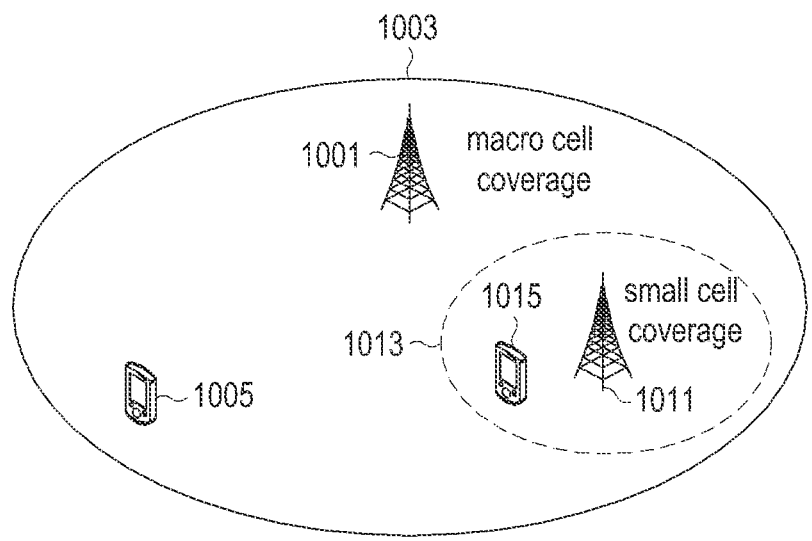
FIG. 10 illustrates a method of determining whether a UE is located in coverage area of a small cell eNB that uses an unlicensed band in a Dual Connectivity (DC) method according to an embodiment of the present disclosure.

FIG. 10 illustrates a method of determining whether a UE is located in coverage area of a small cell eNB that uses an unlicensed band in a DC method according to an embodiment of the present disclosure.

Referring to FIG. 10, the dual connectivity method is a method in which one UE is simultaneously connected to two eNBs (e.g., a macro cell eNB and a small cell eNB). It is assumed in FIG. 10 that in the dual connectivity method, a macro cell eNB 1001 uses a licensed band channel and a small cell eNB 1011 uses an unlicensed band channel.

Assuming that the small cell eNB 1011 periodically transmits a synchronization signal over an unlicensed band channel, a UE 1015 located in small cell coverage area 1013 may periodically receive the synchronization signal and report the signal strength of the received synchronization signal to the macro cell eNB 1001. On the other hand, UEs (e.g., a UE 1005) in a coverage area 1003 of the macro cell eNB 1001 may also perform measurement report with respect to the synchronization signal that the macro cell eNB 1001 transmits periodically. For reference, the signal strength may be reported in the form of RRC Measurement Report that is used in the LTE system. Eventually, if the macro cell eNB 1001 receives a measurement report for the synchronization signal of the small cell eNB 1011 from the UE 1015, the macro cell eNB 1001 may determine that the UE 1015 that has transmitted the measurement report is now in the coverage area 1013 of the small cell eNB 1001 that uses the unlicensed band.

Alternatively, the eNB may estimate the location of the UE using the Global Positioning System (GPS), or may estimate the location of the UE from the signals received from multiple eNBs using a certain method, such as a triangulation method. In addition, when UEs are concentrated in a particular area, the eNB may estimate the particular area by the GPS and the like, and request only some of the concentrated UEs to report WLAN channel information. By doing so, it is possible to minimize the resource consumption of the UEs.

Referring back to FIGS. 5A and 5B, the operation of determining an unlicensed band channel, which has been described in operation 430 of FIG. 4, will be described below. This operation may correspond to operations 531 and 533 in FIG. 5A.

First, in operation 531, the eNB 501 may select an optimal unlicensed band channel based on the unlicensed band channel information, and configure the selected unlicensed band channel as a channel of a secondary cell (SCell) or a small cell (SCell) for cellular communication. The secondary cell is applied when the entire system is operated by the CA method, and the small cell is applied when the entire system is operated by the dual connectivity method.

The secondary cell or the small cell may be configured as the eNB 501 transmits an RRC Connection Reconfiguration message to the UE 503. This message may include Radio Resource Configuration information including at least one of Cell Index of a secondary cell (or a small cell), which should be newly configured or changed, Physical Cell ID, Cell Identification including a carrier frequency, Bandwidth, and Physical Channel Configuration. Thereafter, in operation 533, the UE 503 may configure an unlicensed band channel depending on the information included in the received RRC Connection Reconfiguration message.

Operation 440 in FIG. 4 will be described below with reference to operations 541 to 548 in FIG. 5B.

Before the eNB 501 activates the selected unlicensed band channel, if a device of another radio technology that uses the selected unlicensed band channel is using the same unlicensed band channel, the eNB 501 may prevent the device from using the same channel.

In operation 541, in order to protect the unlicensed band channel from the interference by the WLAN AP 505 that uses the same channel as the selected unlicensed band channel, the eNB 501 may determine whether the UE 503 has the capability to transmit a channel blocking request message to the WLAN AP 505 (e.g., the capability to transmit a 40 MHz Intolerant bit report of IEEE 802.11n WLAN). In other words, if the UE has such capability as the UE has a WLAN interface, the eNB 501 may proceed to operation 542. If the has no WLAN interface, the eNB 501 may proceed to operation 545.

In operation 542, the eNB 501 may transmit a channel blocking request message to the UE 503 in order to prevent the IEEE 802.11n-based WLAN AP 505 that uses the selected unlicensed band channel, from using a part or whole of the same band channel as the selected unlicensed band channel. In an alternative embodiment of the present disclosure, the channel blocking request message may be sent only when the WLAN AP 505 uses the selected unlicensed band channel only as a secondary channel. In other words, if the WLAN AP 505 uses the selected unlicensed band channel as a primary channel, the eNB 501 may allow the WLAN AP 505 to continuously use the unlicensed band channel as the primary channel, without transmitting the channel blocking request message.

In operation 543, the UE 503 may transmit a channel blocking request message to the WLAN AP 505. For reference, the channel blocking request message may be sent in the form of an Intolerant Channel Report message.

In operation 544, the WLAN AP 505 may receive the channel blocking request message (e.g., Intolerant Channel Report message) from the UE 503. If the WLAN AP 505 has been using the unlicensed band channel selected by the eNB 501 as a secondary channel, the WLAN AP 505 may use only the 20 MHz primary channel without using the secondary channel after receiving the channel blocking request message, even though the WLAN AP 505 has been using a combined 40 MHz channel of the 20 MHz primary channel and the 20 MHz secondary channel through channel bonding. By doing so, it is possible to minimize the interference from the WLAN AP 505 to the unlicensed band channel that the eNB 501 has configured for the secondary channel that the WLAN AP 505 uses for cellular communication. A change in the channel that the WLAN AP 505 operates before and after receiving the channel blocking request message is illustrated in FIG. 13.

Figure 13:
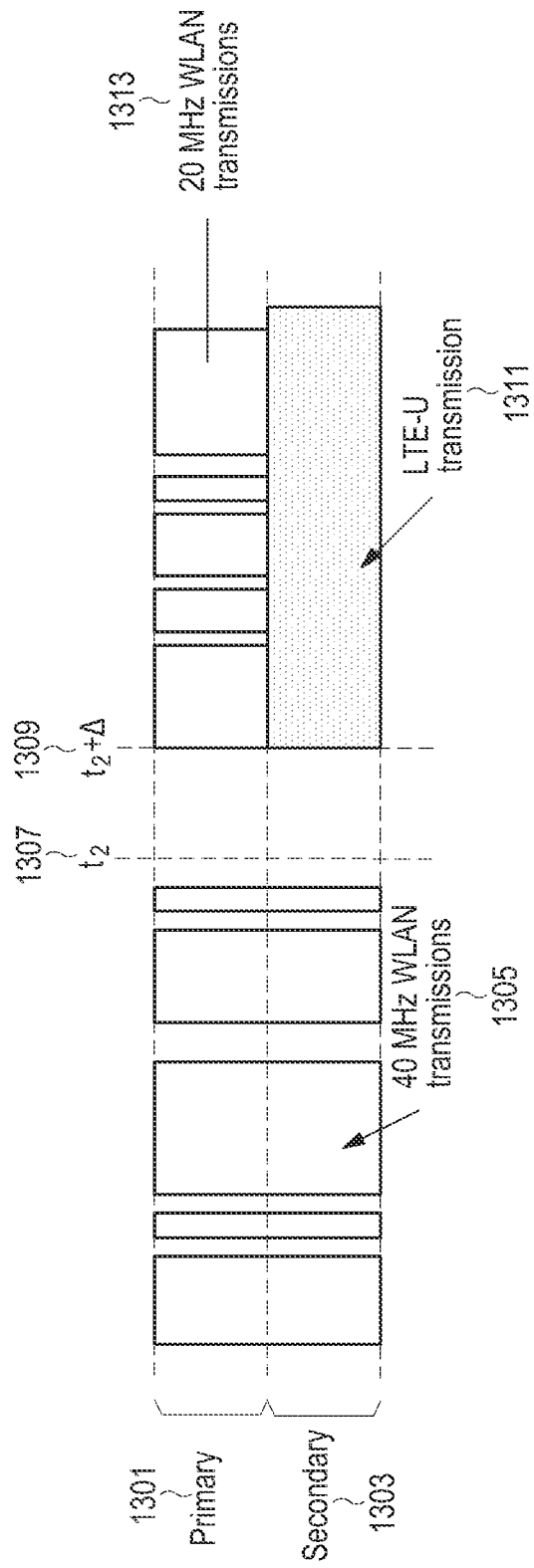
FIG. 13 illustrates a change in an unlicensed band channel used by a WLAN AP according to an embodiment of the present disclosure.

FIG. 13 illustrates a change in an unlicensed band channel used by a WLAN AP according to an embodiment of the present disclosure.

Referring to FIG. 13, even though the WLAN AP 505 uses a primary channel 1301 and a secondary channel 1303 through channel bonding before time t2 1307, the WLAN AP 505 may receive a channel blocking request message through a secondary-40 channel 1305 for the secondary channel 1303 at time t2, and use a secondary-20 channel 1313 at time 1309 that a certain period of time for channel blocking has elapsed. The secondary channel 1303 may be used for unlicensed band cellular communication LTE-Unlicensed (LTE-U) since the time 1309 as shown by reference numeral 1311.

In operation 545, in order to protect the unlicensed band channel from the interference by the Bluetooth master 505 that uses the same channel as the selected unlicensed band channel, the eNB 501 may determine whether the Bluetooth master 505 that uses the selected unlicensed band channel needs to exclude the channel from frequency hopping, and whether the UE 503 has the capability to transmit a channel blocking request message to the Bluetooth master 505 (i.e., the capability to transmit an AFBR of Bluetooth). If the Bluetooth master 505 needs to exclude the channel from frequency hopping, and the UE 503 has the capability as the UE 503 has a Bluetooth interface, the eNB 501 may proceed to operation 546. On the contrary, if the Bluetooth master 505 does not need to exclude the channel from frequency hopping, or the UE 503 does not have the capability, the eNB 501 may proceed to operation 551.

In operation 546, the eNB 501 may transmit a channel blocking request message (Adaptive Frequency Hopping (AFH) channel blacklist report) to the UE 503 in order to request the UE 503 having a Bluetooth interface to exclude the band corresponding to the channel of the selected unlicensed band from the frequency hopping candidate bands of Bluetooth.

In operation 547, the UE 503 may transmit a channel blocking request message (AFH channel blacklist report) for requesting the connected Bluetooth master 505 to exclude the selected unlicensed band channel from among the candidates of AFH, to the Bluetooth master 505 through the Bluetooth interface.

In operation 548, the Bluetooth master 505 may receive the channel blocking request message from the UE 503. Thereafter, the Bluetooth master 505 may exclude the channel included in the received message from the candidate bands of the Bluetooth master 505's adaptive frequency hopping. By doing so, it is possible to minimize the interference from the Bluetooth master 505 to the unlicensed band channel that the eNB 501 has configured in the channel that the Bluetooth master 505 uses for cellular communication. A change in the channel that the Bluetooth master 505 operates before and after receiving the channel blocking request message is illustrated in FIG. 14.

Figure 14:
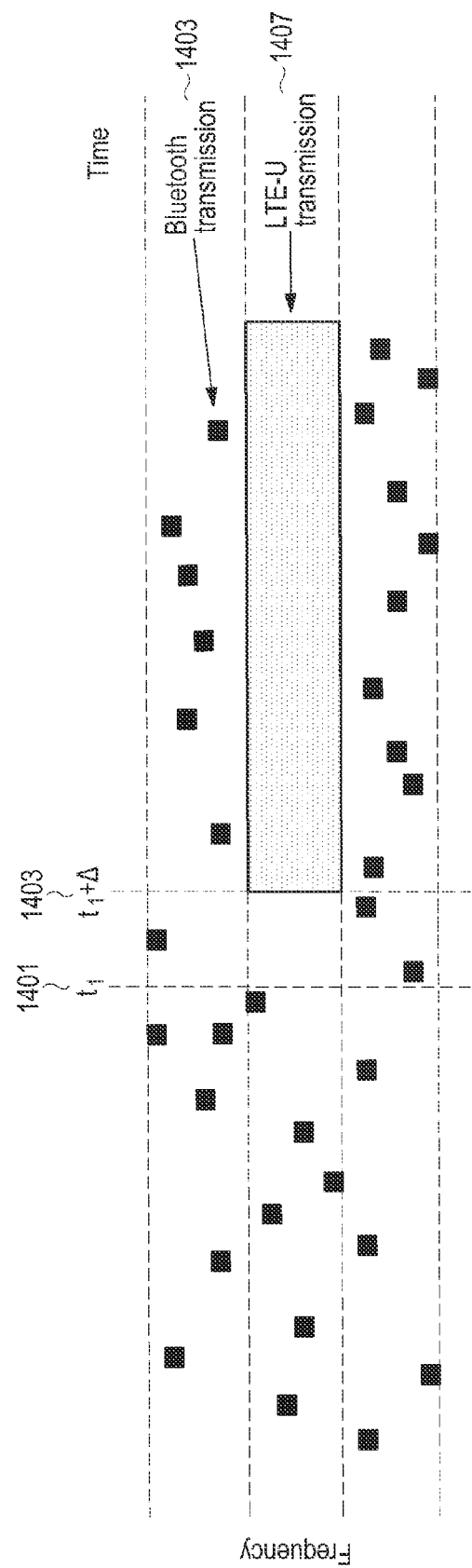
FIG. 14 illustrates a change in an unlicensed band channel used by a Bluetooth master according to an embodiment of the present disclosure.

FIG. 14 illustrates a change in an unlicensed band channel used by a Bluetooth master according to an embodiment of the present disclosure.

Referring to FIG. 14, the Bluetooth master 505 has performed frequency hopping in three unlicensed bands before time t1 1401. However, the Bluetooth master 505 may receive a channel blocking request message at time t1, and since the time 1403 that a certain period of time for channel blocking has elapsed, the channel, blocking of which is requested by the channel blocking request message, may be used for unlicensed band cellular communication LTE-U as shown by reference numeral 1407, and frequency hopping may be performed in the band except for the blocked band as shown by reference numeral 1403.

Referring back to FIG. 5B, in operation 551 corresponding to operation 450 in FIG. 4, the eNB 501 may activate the configured unlicensed band channel to transmit and receive the traffic between the eNB 501 and the UE 503 through the unlicensed band.

The operation of collecting WLAN information by the eNB, which has been described in operations 511 and 513 of FIG. 5A (or in operation 410 of FIG. 4) will be described below. An example of actively obtaining channel information by the eNB will be described in FIG. 11, and an example of passively obtaining channel information by the eNB will be described in FIG. 12.

Figure 11:
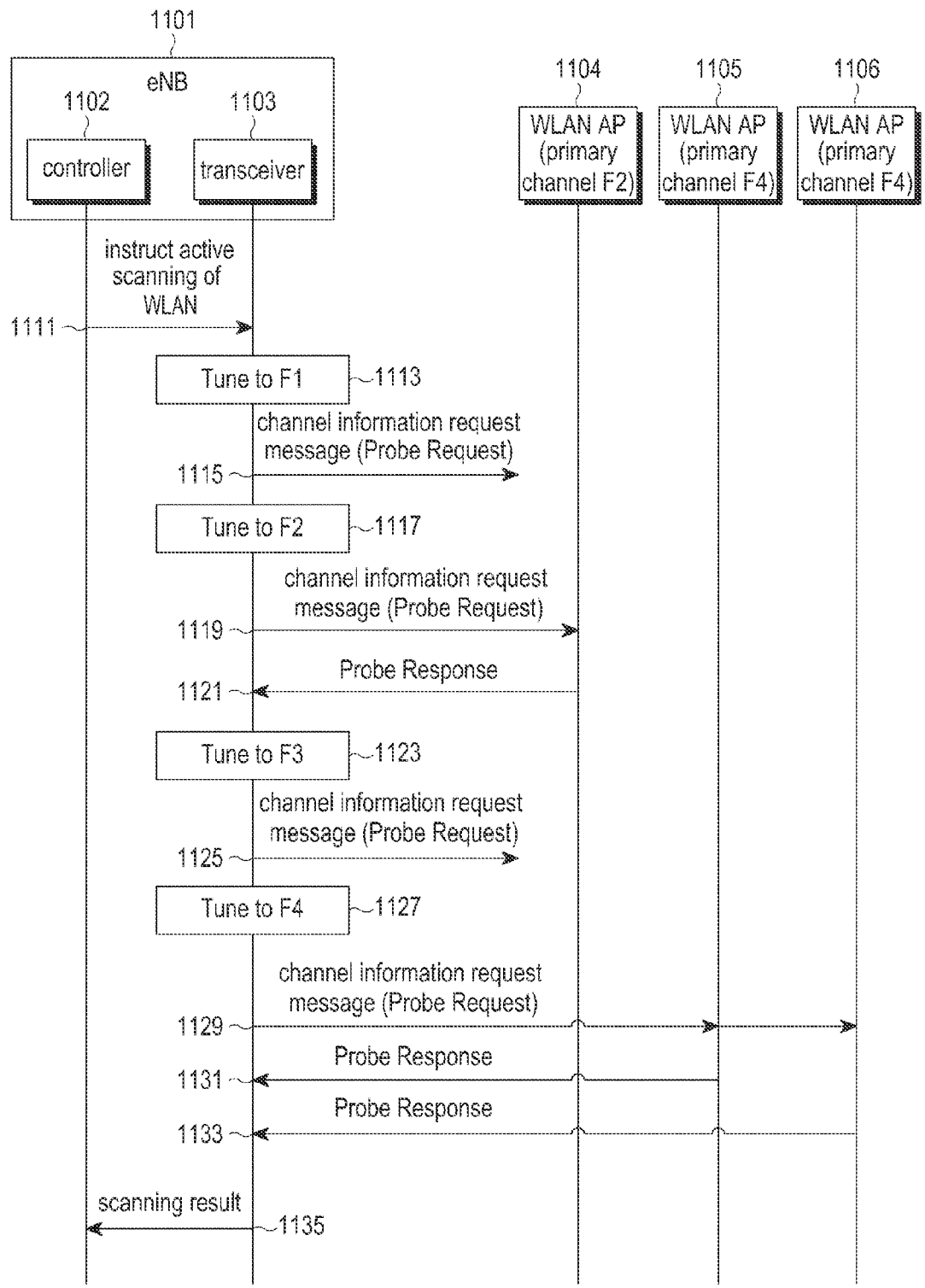
FIG. 11 illustrates an operation of actively obtaining unlicensed band channel information by an eNB itself according to an embodiment of the present disclosure.

FIG. 11 illustrates an operation of actively obtaining unlicensed band channel information by an eNB itself according to an embodiment of the present disclosure.

Referring to FIG. 11, an eNB 1101 may include a controller 1102 and a transceiver 1103 for supporting transmission/reception with an IEEE 802.11-based WLAN AP. It will be assumed that three WLAN APs 1104, 1105, and 1106 are present in the coverage area of the eNB 1101, the WLAN AP 1104 uses F2 as a primary channel and the WLAN APs 1105 and 1106 use F4 as a primary channel.

In operation 1111, the controller 1102 of the eNB 1101 may instruct the transceiver 1103 to perform active scanning of WLAN. Accordingly, the transceiver 1103 may transmit a channel information request message over each unlicensed band channel. The channel information request message may be broadcasted in the form of a Probe Request frame.

In other words, first, in operations 1113 and 1115, the transceiver 1103 may turn the frequency to F1 and broadcast a Probe Request frame. However, since there is no WLAN AP that is using the F1 frequency, the transceiver 1103 has failed to receive a Probe Response frame to the Probe Request frame from any WLAN AP.

Second, in operations 1117 and 1119, the transceiver 1103 of the eNB 1101 may turn the frequency to F2 and broadcast a Probe Request frame. Since the WLAN AP 1104 uses F2, the WLAN AP 1104 may receive the Probe Request frame for F2, and transmit a Probe Response frame to the Probe Request frame to the eNB 1101 in operation 1121. For reference, information included in the Probe Response frame may be almost the same as the information included in the beacon frame described in FIG. 7.

Third, in operations 1123 and 1125, the transceiver 1103 of the eNB 1101 may turn the frequency to F3 and broadcast a Probe Request frame. However, since there is no WLAN AP that is using the F3 frequency, the transceiver 1103 has failed to receive a Probe Response frame to the Probe Request frame from any WLAN AP.

Fourth, in operations 1127 and 1129, the eNB 1101 may turn the frequency to F4 and broadcast a Probe Request frame. Since the WLAN APs 1105 and 1106 both use F4, the WLAN APs 1105 and 1106 may receive the Probe Request frame for F4. Therefore, the WLAN AP 1105 may transmit a Probe Response frame to the eNB 1101 in response to reception of the Probe Request frame for F4 in operation 1131, and the WLAN AP 1106 may transmit a Probe Response frame to the eNB 1101 in response to reception of the Probe Request frame for F4 in operation 1133.

In operation 1135, the transceiver 1103 may deliver to the controller 1102 the scanning results including the WLAN channel information (e.g., channel configuration information and channel usage status information) collected from the Probe Response frames.

Figure 12:
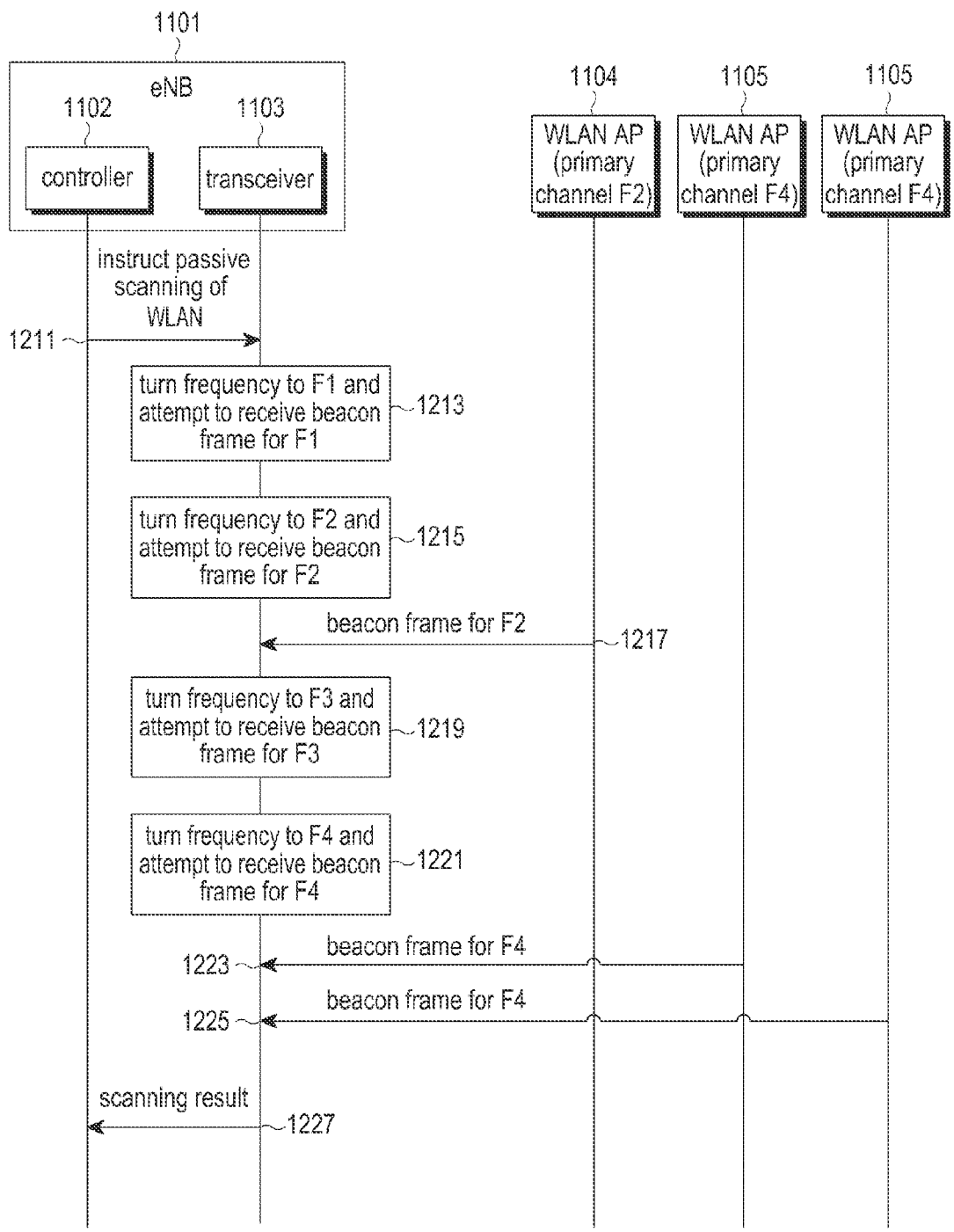
FIG. 12 illustrates an operation of passively obtaining unlicensed band channel information by an eNB itself according to an embodiment of the present disclosure.

FIG. 12 illustrates an operation of passively obtaining unlicensed band channel information by an eNB itself according to an embodiment of the present disclosure.

Referring to FIG. 12, the assumption is the same as that described in FIG. 11. In other words, the eNB 1101 may include a controller 1102 and a transceiver 1103 for supporting transmission/reception with a WLAN AP. It will be assumed that three WLAN APs 1104, 1105 and 1106 are present in the coverage area of the eNB 1101, the WLAN AP 1104 uses F2 as a primary channel and the WLAN APs 1105 and 1106 use F4 as a primary channel.

In operation 1211, the controller 1102 may instruct the transceiver 1103 to perform passive scanning of WLAN. Accordingly, the transceiver 1103 may obtain unlicensed band channel information by receiving a beacon frame over each unlicensed band channel in operations 1213 to 1225. An operation for each frequency is as follows.

First, in operation 1213, the transceiver 1103 may turn the frequency to F1 and attempt to receive a beacon frame for F1 during a certain period of time. However, since there is no WLAN AP that is using F1, the transceiver 1103 has failed to receive any beacon frame for F1.

Second, if the certain period of time for reception of an F1 beacon frame expires, the transceiver 1103 may turn the frequency to F2 and attempt to receive a beacon frame for F2 during a certain period of time in operation 1215. Since the WLAN AP 1104 uses F2 as a primary channel, the WLAN AP 1104 may periodically broadcast the beacon frame for F2. Therefore, in operation 1217, the transceiver 1103 may receive the beacon frame that the WLAN AP 1104 has broadcasted.

Third, in operation 1219, the transceiver 1103 may turn the frequency to F3 and attempt to receive a beacon frame during a certain period of time. However, since there is no WLAN AP that is using F3, the transceiver 1103 has failed to receive any beacon frame for F3.

Fourth, if the certain period of time for reception of an F3 beacon frame expires, the transceiver 1103 may turn the frequency to F4 and attempt to receive a beacon frame for F4 during a certain period of time in operation 1221. Since WLAN APs 1105 and 1106 use F4 as a primary channel, the WLAN APs 1105 and 1106 may each periodically broadcast the beacon frame for F4. Therefore, in operations 1223 and 1225, the transceiver 1103 may receive the beacon frames that the WLAN APs 1105 and 1106 have broadcasted.

In operation 1227, the transceiver 1103 may deliver to the controller 1102 the scanning results including the channel information (e.g., channel configuration information and channel usage status information) obtained from the beacon frames.

Figure 15:
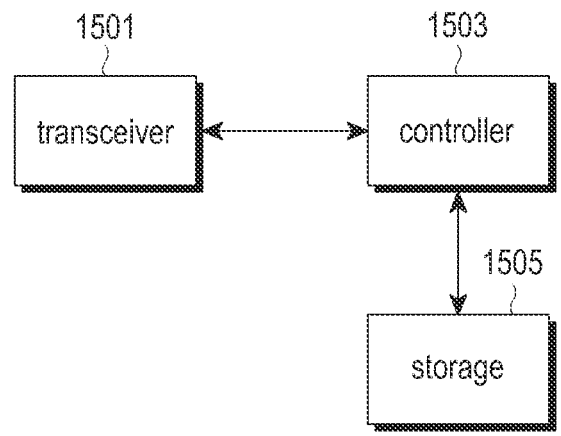
FIG. 15 illustrates a configuration of an eNB according to an embodiment of the present disclosure.

FIG. 15 illustrates a configuration of an eNB according to an embodiment of the present disclosure.

Referring to FIG. 15, the eNB may include a transceiver 1501, a controller 1503 and a storage 1505, and may perform the above-described eNB operation according to an embodiment of the present disclosure.

The transceiver 1501 may include a WLAN or Bluetooth interface to receive unlicensed band channel information from WLAN or Bluetooth through a beacon frame.

The controller 1503 may control the overall operation of the eNB according to an embodiment of the present disclosure. More particularly, the controller 1503 may control the eNB operation described in FIGS. 4, 5A, 5B, and 8. In addition, the controller 1503 may control active scanning or passive scanning as described in FIG. 11 or 12, receive the scanning results according thereto, and store the unlicensed band channel information in the storage 1505. Further, based on the unlicensed band channel information, the controller 1503 may select an optimal unlicensed band channel and configure a channel to a UE. Besides, the controller 1503 may determine whether to perform a channel blocking operation, and control the overall operation for channel blocking.

Figure 16:
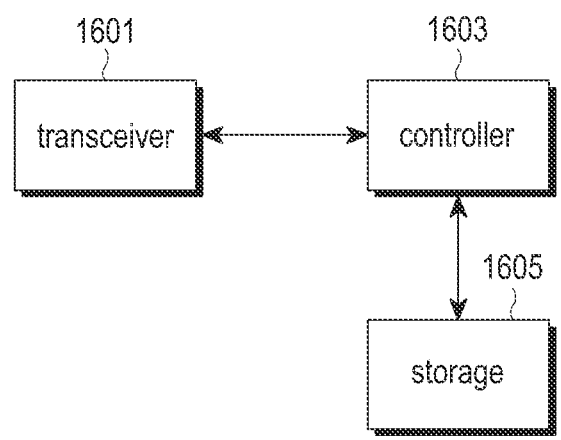
FIG. 16 illustrates a configuration of a UE according to an embodiment of the present disclosure.

FIG. 16 illustrates a configuration of a UE according to an embodiment of the present disclosure.

Referring to FIG. 16, the UE may include a transceiver 1601, a controller 1603 and a storage 1605, and may perform the above-described UE operation according to an embodiment of the present disclosure.

The transceiver 1601 may include a WLAN or Bluetooth interface, to receive unlicensed band channel information from WLAN or Bluetooth through a beacon frame and transmit the received unlicensed band channel information to an eNB. In addition, the transceiver 1601 may receive a channel blocking request message from the eNB, and transmit the received channel blocking request message to a WLAN AP or a Bluetooth master.

The controller 1603 may control the overall operation of the UE according to an embodiment of the present disclosure. More particularly, the controller 1603 may control the UE operation described in FIGS. 4, 5A, and 5B. In addition, the controller 1603 may control active UE scanning or passive UE scanning upon receiving a scanning request from the eNB, and transmit the scanning results corresponding thereto to the eNB. Further, the controller 1603 may configure an unlicensed band channel depending on the channel selected by the eNB, to perform cellular communication. Besides, the controller 1603 may receive a channel blocking message from the eNB and transmit the received channel blocking message to the WLAN AP or Bluetooth master.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for using at least one unlicensed band channel by an evolved node B (eNB) in a cellular wireless communication system, the method comprising:
   receiving unlicensed band channel information from at least one unlicensed band-enabled device that uses an unlicensed band channel;
   selecting the unlicensed band channel to be used for cellular communication based on the received unlicensed band channel information; and
   activating the selected unlicensed band channel,
   wherein the unlicensed band channel information comprises information about whether the unlicensed band channel is used as a primary channel or as a secondary channel of a corresponding unlicensed band-enabled device that uses the unlicensed band channel, and
   wherein the unlicensed band channel is selected based on a weight that is determined depending on whether the unlicensed band channel is used as the primary channel or the secondary channel of the corresponding unlicensed band-enabled device.

2. The method of claim 1, wherein the receiving of the unlicensed band channel information comprises:
   broadcasting a channel information request message over each of at least one unlicensed band channel; and
   receiving a response message to the broadcasted channel information request message from the at least one unlicensed band-enabled device.

3. The method of claim 1, further comprising:
   requesting the unlicensed band channel information from at least one user equipment (UE) in a cell of the eNB; and
   receiving the unlicensed band channel information from the at least one UE.

4. The method of claim 3, wherein the selecting of the unlicensed band channel comprises selecting the unlicensed band channel based on the unlicensed band channel information received from the at least one unlicensed band-enabled device and the unlicensed band channel information received from the at least one UE.

5. The method of claim 3, wherein the requesting of the unlicensed band channel information comprises:
   determining whether the at least one UE is located in an unlicensed band communication coverage area of the eNB; and
   requesting the unlicensed band channel information from the at least one UE that is located in the unlicensed band communication coverage area of the eNB.

6. The method of claim 5, wherein the determining of whether the at least one UE is located in the unlicensed band communication coverage area of the eNB comprises:
   determining, if the eNB operates in a carrier aggregation (CA) method, whether the at least one UE is located in the unlicensed band communication coverage area by using a signal strength of a reference signal that the at least one UE transmits on an uplink of a licensed band.

7. The method of claim 5, wherein the determining of whether the at least one UE is located in the unlicensed band communication coverage area of the eNB comprises:
   determining, if the eNB is a macro cell eNB of a dual connectivity (DC) method, whether the at least one UE is located in the unlicensed band communication coverage area by using a measurement report received from the at least one UE.

8. The method of claim 3, further comprising transmitting information about the selected unlicensed band channel to the at least one UE.

9. The method of claim 3, further comprising:
   before activating the selected unlicensed band channel, transmitting a channel blocking request message to an unlicensed band-enabled device that uses at least a part of the selected unlicensed band channel via the at least one UE to prevent the unlicensed band-enabled device from using the at least a part of the selected unlicensed band channel.

10. The method of claim 1, wherein the weight is determined for each of the at least one unlicensed band channel based on the received unlicensed band channel information.

11. The method of claim 1, wherein the unlicensed band channel information comprises channel configuration information of the unlicensed band channel and channel usage information of the unlicensed band channel.

12. The method of claim 11, wherein the channel configuration information comprises information about whether there is an unlicensed band-enabled device that is set for the unlicensed band channel.

13. The method of claim 11, wherein the channel usage information comprises utilization information for the unlicensed band channel.

14. The method of claim 1, wherein the unlicensed band-enabled device comprises one of a wireless local area network (WLAN) access point (AP) or a Bluetooth master.

15. The method of claim 1, wherein the unlicensed band channel information comprises information about a number of UEs that are using the unlicensed band channel.

16. An evolved node B (eNB) for using at least one unlicensed band channel in a cellular wireless communication system, the eNB comprising:
   a transceiver configured to receive unlicensed band channel information from at least one unlicensed band-enabled device that uses an unlicensed band channel; and
   at least one processor configured to:
      select the unlicensed band channel to be used for cellular communication based on the received unlicensed band channel information, and
      activate the selected unlicensed band channel,
   wherein the unlicensed band channel information comprises information about whether the unlicensed band channel is used as a primary channel or as a secondary channel of a corresponding unlicensed band-enabled device that uses the unlicensed band channel, and
   wherein the unlicensed band channel is selected based on a weight that is determined depending on whether the unlicensed band channel is used as the primary channel or the secondary channel of the corresponding unlicensed band-enabled device.

17. The eNB of claim 16, wherein the transceiver is further configured to:
   broadcast a channel information request message over each of at least one unlicensed band channel, and receive a response message to the broadcasted channel information request message from the at least one unlicensed band-enabled device.

18. The eNB of claim 16, wherein the transceiver is further configured to:
   request the unlicensed band channel information from at least one user equipment (UE) in a cell of the eNB, and
   receive the unlicensed band channel information from the at least one UE.

19. The eNB of claim 18, wherein the controller at least one processor is further configured to select the unlicensed band channel based on the unlicensed band channel information received from the at least one unlicensed band-enabled device and the unlicensed band channel information received from the at least one UE.

20. The eNB of claim 18, wherein the transceiver is further configured to:
   determine whether the at least one UE is located in an unlicensed band communication coverage area of the eNB, and
   request the unlicensed band channel information from the at least one UE that is located in the unlicensed band communication coverage area of the eNB.

21. The eNB of claim 20, wherein, if the eNB operates in a carrier aggregation (CA) method, the transceiver is further configured to determine whether the at least one UE is located in the unlicensed band communication coverage area of the eNB by using a signal strength of a reference signal that the at least one UE transmits on an uplink of a licensed band.

22. The eNB of claim 20, wherein, if the eNB is a macro cell eNB of a dual connectivity (DC) method, the transceiver is further configured to determine whether the at least one UE is located in the unlicensed band communication coverage area of the eNB by using a measurement report received from the at least one UE.

23. The eNB of claim 18, wherein the transceiver is further configured to transmit, before activating the selected unlicensed band channel, a channel blocking request message to an unlicensed band-enabled device that uses at least a part of the selected unlicensed band channel via the at least one UE to prevent the unlicensed band-enabled device from using the at least a part of the selected unlicensed band channel.

24. The eNB of claim 16, wherein the weight is determined for each of the at least one unlicensed band channel based on the received unlicensed band channel information.

25. The eNB of claim 16, wherein the transceiver is further configured to transmit information about the selected unlicensed band to the at least one UE.

26. The eNB of claim 16, wherein the unlicensed band channel information comprises channel configuration information of the unlicensed band channel and channel usage information of the unlicensed band channel.

27. The eNB of claim 26, wherein the channel configuration information comprises information about whether there is an unlicensed band-enabled device that is set for the unlicensed band channel.

28. The eNB of claim 26, wherein the channel usage information comprises utilization information for the unlicensed band channel.

29. The eNB of claim 16, wherein the unlicensed band-enabled device comprises one of a wireless local area network (WLAN) access point (AP) or a Bluetooth master.

30. The eNB of claim 16, wherein the unlicensed band channel information comprises information about a number of UEs that are using the unlicensed band channel.

31. A method for using at least one unlicensed band channel by a user equipment (UE) in a cellular wireless communication system, the method comprising:
   receiving unlicensed band channel information from an unlicensed band-enabled device that uses an unlicensed band channel;
   transmitting the received unlicensed band channel information to an evolved node B (eNB);
   receiving, from the eNB, information about a channel that is selected by the eNB based on the unlicensed band channel information; and
   configuring the unlicensed band channel to the eNB depending on the information about the selected channel,
   wherein the unlicensed band channel information comprises information about whether the unlicensed band channel is used as a primary channel or as a secondary channel of the unlicensed band-enabled device that uses the unlicensed band channel, and
   wherein the channel is selected based on a weight that is determined depending on whether the unlicensed band channel is used as the primary channel or the secondary channel of the unlicensed band-enabled device.

32. The method of claim 31, further comprising, before receiving the unlicensed band channel information, receiving a channel information request message of the at least one unlicensed band from the eNB.

33. The method of claim 31, further comprising:
   receiving, from the eNB, a channel blocking request message to prevent an unlicensed band-enabled device that uses at least a part of the selected channel from using at least a part of the selected channel; and
   transmitting the channel blocking request message to the unlicensed band-enabled device.

34. The method of claim 31, wherein the unlicensed band channel information comprises channel configuration information of the at least one unlicensed band and channel usage information of the unlicensed band.

35. The method of claim 34, wherein the channel configuration information comprises information about whether there is an unlicensed band-enabled device that is set for the unlicensed band channel.

36. The method of claim 34, wherein the channel usage information comprises utilization information for the unlicensed band channel.

37. The method of claim 31, wherein the unlicensed band-enabled device comprises one of a wireless local area network (WLAN) access point (AP) or a Bluetooth master.

38. The method of claim 31, wherein the unlicensed band channel information comprises information about a number of UEs that are using the unlicensed band channel.

39. The method of claim 31, wherein the weight is determined for each of the at least one unlicensed band channel based on the received unlicensed band channel information.

40. A User Equipment (UE) for using at least one unlicensed band channel in a cellular wireless communication system, the UE comprising:
   a transceiver configured to:
      receive unlicensed band channel information from an unlicensed band-enabled device that uses an unlicensed band channel,
      transmit the received unlicensed band channel information to an evolved Node B (eNB), and
      receive, from the eNB, information about a channel that is selected by the eNB based on the unlicensed band channel information; and at least one processor configured to configure the unlicensed band channel to the eNB depending on the information about the selected channel, wherein the unlicensed band channel information comprises information about whether the unlicensed band channel is used as a primary channel or as a secondary channel of the unlicensed band-enabled device that uses the unlicensed band channel, and wherein the channel is selected based on a weight that is determined depending on whether the unlicensed band channel is used as the primary channel or the secondary channel of the unlicensed band-enabled device.

41. The UE of claim 40, wherein, before receiving the unlicensed band channel information, the transceiver is further configured to receive a channel information request message of the at least one unlicensed band from the eNB.

42. The UE of claim 40, wherein the transceiver is further configured to:

receive, from the eNB, a channel blocking request message to prevent an unlicensed band-enabled device that uses at least a part of the selected channel from using at least a part of the selected channel, and transmit the channel blocking request message to the unlicensed band-enabled device.

43. The UE of claim 40, wherein the unlicensed band channel information comprises channel configuration information of the at least one unlicensed band and channel usage information of the unlicensed band.

44. The UE of claim 43, wherein the channel configuration information comprises information about whether there is an unlicensed band-enabled device that is set for the unlicensed band channel.

45. The UE of claim 43, wherein the channel usage information comprises utilization information for the unlicensed band channel.

46. The UE of claim 40, wherein the unlicensed band-enabled device comprises one of a wireless local area network (WLAN) access point (AP) or a Bluetooth master.

47. The UE of claim 40, wherein the unlicensed band channel information comprises information about a number of UEs that are using the unlicensed band channel.

48. The UE of claim 40, wherein the weight is determined for each of the at least one unlicensed band channel based on the received unlicensed band channel information.

* * * * *